(12) United States Patent
Otsubo et al.

(10) Patent No.: US 10,471,650 B2
(45) Date of Patent: Nov. 12, 2019

(54) METHOD OF MANUFACTURING HIGH PRESSURE GAS TANK

(71) Applicant: TOYOTA JIDOSHA KABUSHIKI KAISHA, Toyota-shi, Aichi-ken (JP)

(72) Inventors: Hirokazu Otsubo, Nagoya (JP); Masato Nakajima, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 282 days.

(21) Appl. No.: 15/486,708

(22) Filed: Apr. 13, 2017

(65) Prior Publication Data

US 2017/0297259 A1    Oct. 19, 2017

(30) Foreign Application Priority Data

Apr. 14, 2016 (JP) ................. 2016-080749
Mar. 3, 2017 (JP) ................. 2017-040546

(51) Int. Cl.
*B29C 63/24* (2006.01)
*B29C 63/00* (2006.01)
(Continued)

(52) U.S. Cl.
CPC .......... *B29C 63/24* (2013.01); *B29C 63/0021* (2013.01); *B29C 63/0073* (2013.01);
(Continued)

(58) Field of Classification Search
CPC ..... B29C 63/0021; B29C 65/48; B29C 63/24; B29C 63/0073; B29C 53/605; B29C 70/32; F17C 2223/036; F17C 1/06; F17C 2201/0109; F17C 2201/056; F17C 2203/0604; F17C 2203/0619; F17C 2203/066; F17C 2203/067;
(Continued)

(56) References Cited

U.S. PATENT DOCUMENTS 5,429,845 A    7/1995   Newhouse et al.
5,882,838 A *  3/1999   Hoshi ................. G03F 7/0285
                                                    430/202
(Continued)

FOREIGN PATENT DOCUMENTS

JP    6-137433      5/1994
JP    2014-142017   8/2014

OTHER PUBLICATIONS

Toyota Gijutsukokaishu, No. 27187, pp. 29-30 (Apr. 25, 2014).

*Primary Examiner* — Vishal I Patel
(74) *Attorney, Agent, or Firm* — Finnegan, Henderson, Farabow, Garrett & Dunner, LLP

(57) ABSTRACT

A liner includes dome sections having outer surfaces along an uniform stress surface at both ends in an axial direction, and nozzles are mounted on the dome section by introducing nozzle flanges into pedestal sections of apexes of the dome sections. Then, ring-shaped caps having the same linear expansion coefficient as the liner and inner surfaces in a curved surface shape of outer surfaces of the dome sections and the nozzle flanges are mounted on boundary portions between the nozzle flanges and the pedestal sections. In forming a fiber layer after that, a helical winding layer is formed first by winding a fiber bundle disposed at the dome sections to cover the dome sections while including the nozzle flanges.

13 Claims, 16 Drawing Sheets

(51) Int. Cl.
- *B29C 65/48* (2006.01)
- *F17C 1/06* (2006.01)
- *B29C 70/32* (2006.01)
- *B29K 63/00* (2006.01)
- *B29K 105/08* (2006.01)
- *B29K 307/04* (2006.01)
- *B29L 31/00* (2006.01)
- *B29C 53/60* (2006.01)

(52) U.S. Cl.
CPC .............. *B29C 65/48* (2013.01); *B29C 70/32* (2013.01); *F17C 1/06* (2013.01); *B29C 53/605* (2013.01); *B29K 2063/00* (2013.01); *B29K 2105/08* (2013.01); *B29K 2307/04* (2013.01); *B29L 2031/712* (2013.01); *F17C 2201/0109* (2013.01); *F17C 2201/056* (2013.01); *F17C 2203/0604* (2013.01); *F17C 2203/066* (2013.01); *F17C 2203/067* (2013.01); *F17C 2203/0619* (2013.01); *F17C 2205/0305* (2013.01); *F17C 2205/0308* (2013.01); *F17C 2209/2154* (2013.01); *F17C 2209/227* (2013.01); *F17C 2223/0123* (2013.01); *F17C 2223/036* (2013.01)

(58) Field of Classification Search
CPC ...... F17C 2205/0305; F17C 2205/0308; F17C 2209/2154; F17C 2209/227; F17C 2223/0123; B29K 2105/08; B29K 2063/00; B29K 2307/04; B29L 2031/712
See application file for complete search history.

(56) References Cited

U.S. PATENT DOCUMENTS 7,354,495 B2 * 4/2008 Carter ...................... F17C 1/06
                                                                   156/169
8,091,203 B2 * 1/2012 Kleber ...................... F17C 1/14
                                                                   220/560.04

* cited by examiner

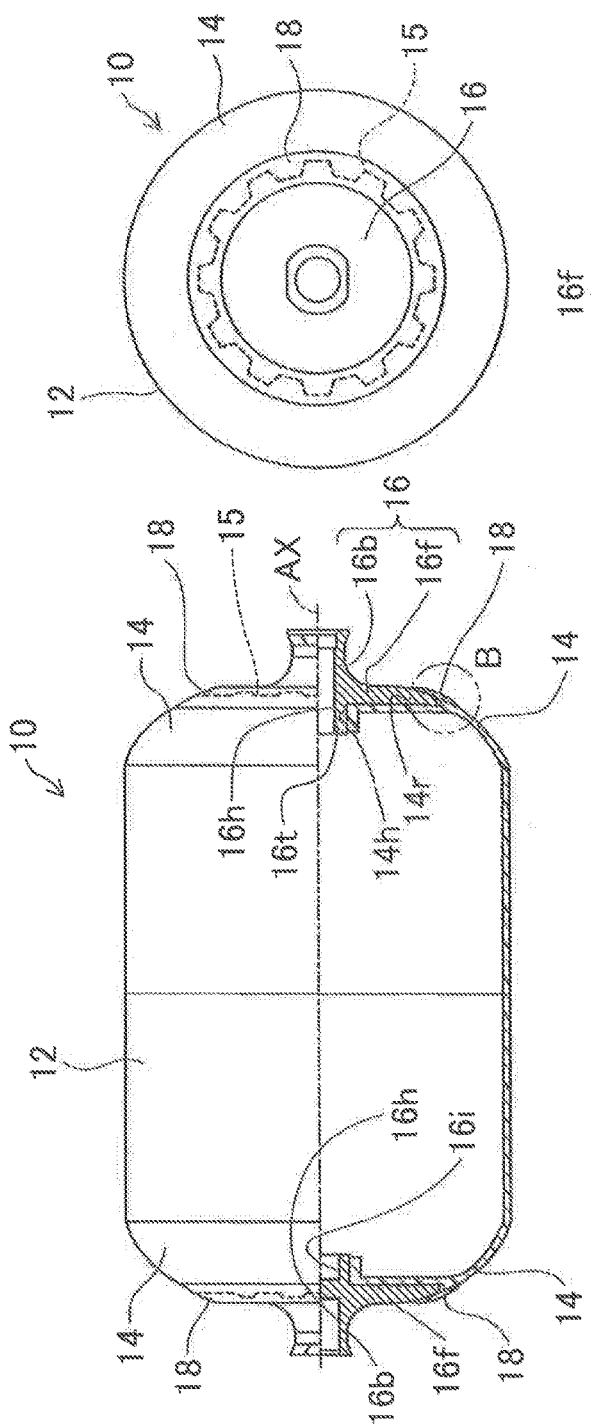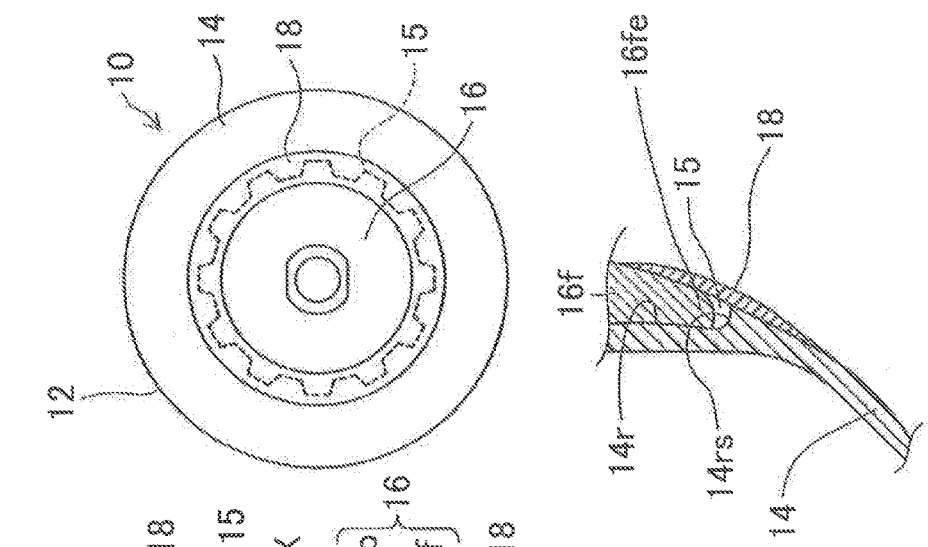

FIG. 8
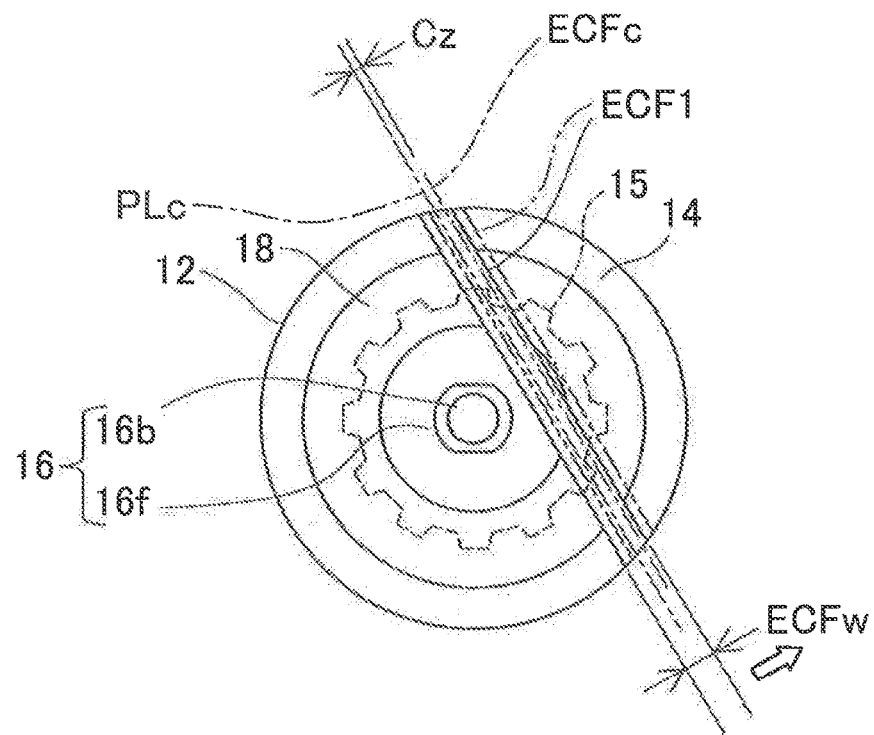
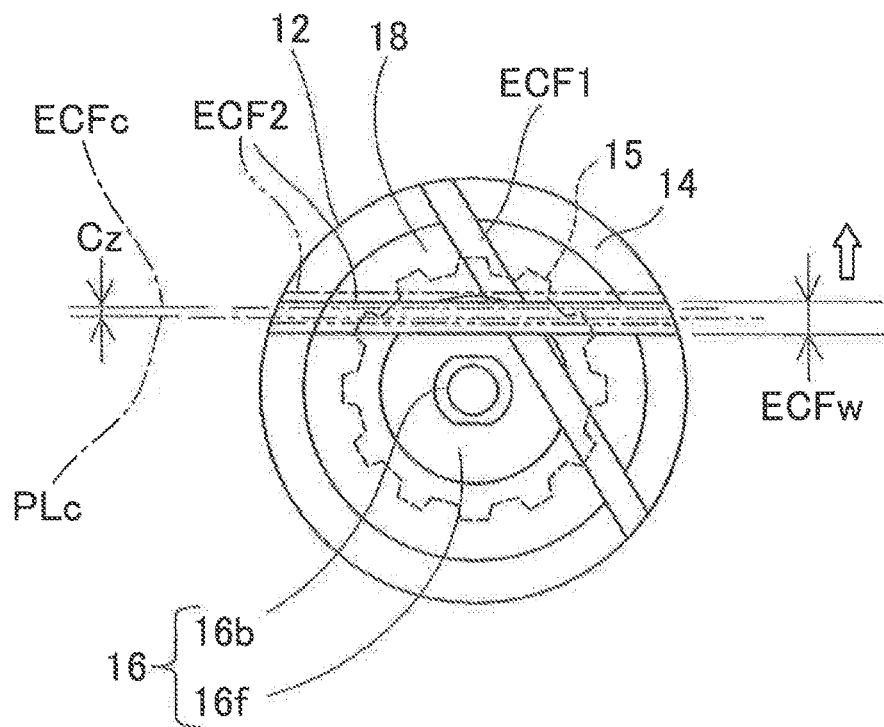

METHOD OF MANUFACTURING HIGH PRESSURE GAS TANK

INCORPORATION BY REFERENCE

The disclosure of Japanese Patent Application No. 2016-080749 filed on Apr. 14, 2016 and Japanese Patent Application No. 2017-040546 filed on Mar. 3, 2017, each including the specification, drawings and abstract, is incorporated herein by reference in its entirety.

BACKGROUND

1. Technical Field

The present disclosure relates to a method of manufacturing a high pressure gas tank.

2. Description of Related Art

A high pressure gas tank is manufactured by coating a liner with carbon fiber reinforced plastic or glass fiber reinforced plastic (hereinafter, these are generally referred to as a fiber reinforced resin layer) using the liner as a core material. Conventionally, the liner becomes a hollow container formed of a resin and having a gas barrier property in view of reduction in weight, and a nozzle is a metallic formed product. For this reason, a tank manufacturing method of securing a gas sealability between the nozzle and the liner in a tank manufacturing process has been proposed (for example, Japanese Patent Application Publication No. 2014-142017 (JP 2014-142017 A)).

SUMMARY

In the manufacturing method proposed in JP 2014-142017 A, a thermosetting resin such as epoxy resin or the like is suppressed from entering between a flange of a nozzle and a liner from a fiber bundle impregnated with the thermosetting resin using a seal member such as a liquid gasket or the like by applying the seal member to a boundary portion between the flange of the nozzle and the liner prior to forming a fiber reinforced resin layer through a filament winding method (hereinafter, a FW method). Incidentally, it is a fact that since the seal member of the boundary portion between the flange of the nozzle and the liner is a liquid upon application, the liquid seal member should be cured in order to guarantee suppression of entry of the resin, and time is consumed in manufacturing the tank to the extent of the curing waiting time. In addition, the liquid seal material is a cause of an increase in cost due to necessity of artificial adjustment and treatment of an application shape, or the like, in addition to complex mixing thereof. As a result, there is a need to provide a new tank manufacturing method capable of suppressing entry of the thermosetting resin from the fiber bundle impregnated with the thermosetting resin conveniently at a low cost without using the liquid seal member.

The present disclosure can be implemented as the following aspects.

According to an aspect of the present disclosure, a method of manufacturing a high pressure gas tank is provided. The method of manufacturing a high pressure gas tank including a fiber layer formed by mounting nozzles on apexes of dome sections of both ends of a liner in an axial direction and repeatedly winding a fiber bundle on an external surface of the liner includes: preparing the liner having pedestal sections having outer surfaces on which the dome sections are installed along an uniform stress surface and concave surfaces on which the nozzles are mounted on the apexes of the dome sections; mounting the nozzles having nozzle flanges entering the pedestal sections and nozzle main bodies protruding from the nozzle flanges toward end sides of the liner on the apexes such that the nozzle flanges enter the pedestal sections; mounting ring-shaped caps on boundary portions between flange outer circumferential edges of the nozzle flanges entering the pedestal sections and inner circumferential walls of the pedestal sections, and covering boundary gaps of the boundary portions with the caps; and forming the fiber layer by repeatedly winding the fiber bundle impregnated with a thermosetting resin on an external surface of the liner when the nozzles and the caps are mounted. Then, the caps having the same linear expansion coefficient as the liner and inner surfaces in a curved surface shape of outer surfaces of the dome sections and outer surfaces of the nozzle flanges are used as the ring-shaped caps when the boundary gaps are covered with the caps, and a helical winding layer is formed first by winding the fiber bundle while including the nozzle flanges to cover the dome sections such that the fiber bundle is disposed on the dome sections of both ends in the axial direction when the fiber layer is formed.

In the method of manufacturing the high pressure gas tank of the aspect, the caps that cover the boundary portions between the flange outer circumferential edges of the nozzle flanges and the pedestal sections are covered with the fiber bundle of the helical winding layer that is formed first. Accordingly, according to the method of manufacturing the high pressure gas tank of the aspect, entry of the thermosetting resin into the boundary portions from the fiber bundle impregnated with the thermosetting resin can be conveniently suppressed by the caps. In addition, according to the method of manufacturing the high pressure gas tank of the aspect, since the ring-shaped caps that can be manufactured at a low cost through a conventional mold forming method are used, entry of the thermosetting resin into the boundary portion can be suppressed at a low cost. Moreover, since there is no need to wait for the curing of the seal material like the conventional method, the high pressure gas tank in which entry of the thermosetting resin into the boundary portion is suppressed can be manufactured in a short time.

In addition, in the method of manufacturing the high pressure gas tank of the aspect, since the ring-shaped cap configured to cover the gap of the boundary portion has the same linear expansion coefficient as the liner, when the thermosetting resin in the formed fiber layer from the fiber bundle impregnated with thermosetting resin is heated and cured, damage to the cap due to a difference in thermal expansion can be suppressed. For this reason, it is preferable if entry of the thermosetting resin into the boundary portion from the damaged spot can also be suppressed. In addition, the cap may be formed of the same material as the liner and have the same linear expansion coefficient as the liner. Of course, the cap and the liner are not limited to being the same material, and the linear expansion coefficient of the gap may be equal to that of the liner within a range in which damage to the cap due to the difference in thermal expansion when the thermosetting resin is heated and cured can be suppressed. In addition, as the cap has an inner surface in a curved surface shape of the outer surface of the dome section and the outer surface of nozzle flange, since adhesion of the cap to the outer surface of the dome section and the outer surface of the nozzle flange is increased, entry of the thermosetting resin into the boundary portion from the gap with the cap can be suppressed.

In the method of manufacturing the high pressure gas tank of the aspect, in forming the helical winding layer that is formed first, winding of the fiber bundle when the helical winding layer is formed may be repeated such that a deviation between a theoretical line defined on the uniform stress surface in the dome sections and a centerline of the fiber bundle is within a half of a width of the fiber bundle. In this way, since the fiber bundle wound to cover the dome section while including the nozzle flange and the cap when the helical winding layer is formed is deviated only within a half of a width of the fiber bundle from a theoretical line defined on the uniform stress surface in the dome section, as the deviation of the fiber bundle on the outer surface of the dome section is suppressed, occurrence of wrinkles in the cap is also suppressed. For this reason, entry of the thermosetting resin into the boundary portion from a wrinkled area in the cap can be prevented.

In the method of manufacturing the high pressure gas tank of the aspect, as the fiber bundle is imaged by a camera, the deviation between the centerline of the fiber bundle and the theoretical line defined on the uniform stress surface may be obtained, and a rotational speed of the liner when the fiber bundle is wound or a reciprocating speed and a reciprocal movement switching timing of a fiber delivery section may be adjusted based on the deviation.

In the method of manufacturing the high pressure gas tank of the aspect, when the fiber layer is formed, a helical winding layer may be formed first by winding the fiber bundle to cover the dome sections while including the nozzle flanges and the caps.

In the method of manufacturing the high pressure gas tank of the aspect, when the fiber layer is formed, an internal pressure of the liner may be boosted after the helical winding layer that is formed first is formed, and in a state in which the internal pressure is boosted, the fiber layer after the helical winding layer that is formed first may be formed by repeatedly winding the fiber bundle on the external surface of the liner. In this way, as a pressure is applied from the liner side to the cap fitted to the fiber layer while covering the gap of the boundary portion between the flange outer circumferential edge of the nozzle flange and the pedestal section, sealability by the cap that covers the gap of the boundary portion by the cap with a high surface pressure, i.e., an effect of suppressing entry of the thermosetting resin into the boundary portion, can be enhanced.

In the method of manufacturing the high pressure gas tank of the aspect, in the fiber layer formed after the helical winding layer that is formed first, the fiber bundle may cross a liner axis at a fiber angle of 11 to 25°.

In the method of manufacturing the high pressure gas tank of the aspect, helical winding in which the fiber bundle crosses the liner axis at the fiber angle of 30 to 60° may be performed at a predetermined interval along with continuation of the helical winding of the fiber layer after the helical winding layer that is formed first.

In the method of manufacturing the high pressure gas tank of any one of the above-mentioned aspects, when the boundary gaps are covered with the caps, each of the caps may be mounted at the boundary portion after an elastic adhesive agent is applied to at least one of an outer surface of the dome section and an outer surface of the nozzle flange. In this way, stabilization of a cap mounting position can be achieved by suppressing the deviation of the cap after the cap is mounted, and entry of the thermosetting resin into the boundary portion from the gap can be prevented by covering the gap that may occur in an inner surface side of the cap due to an intersection with an elastic adhesive agent in manufacturing of the cap.

In the method of manufacturing the high pressure gas tank of any one of the above-mentioned aspects, each of the caps may have a cap-side engaging section including at least one of a convex section and a concave section surrounding the boundary portion on a cap inner circumferential surface, and the liner and the nozzles may have engaging sections configured to engage with the cap-side engaging sections provided in the caps. In this way, even when the thermosetting resin enters from the gap that may occur in the inner surface side of the cap due to an intersection in manufacturing of the cap, specifically, the gap between the cap and the flange outer surface or the gap between the cap and the liner outer surface, the thermosetting resin can be retained in an engaging area between the cap-side engaging section and the engaging section. As a result, an effect of suppressing entry of the thermosetting resin into the boundary portion can be increased. In addition, in addition the cap being able to be positioned through engagement with the cap-side engaging section, a positional deviation of the cap when the fiber bundle is wound can also be suppressed.

In the method of manufacturing the high pressure gas tank of any one of the above-mentioned aspects, the caps may have convex sections entering the boundary gaps. In this way, even when the thermosetting resin enters from the gap that may occur in the inner surface side of the cap due to an intersection in manufacturing of the cap, the thermosetting resin can be retained in the convex section entering the boundary gap. As a result, an effect of suppressing entry of the thermosetting resin into the boundary portion can be increased. In addition, in addition to the cap being able to be positioned by introduction of the convex section into the boundary gap, a positional deviation of the cap when the fiber bundle is wound can also be suppressed.

In the method of manufacturing the high pressure gas tank of the aspect, the boundary gaps may be formed by the inner circumferential wall of the liner and the flange outer circumferential edges of the nozzles in tapered shapes that widen toward the caps, and the caps may have the convex sections as tapered convex sections in the tapered shapes of the boundary gaps. In this way, the following advantages are provided. Since the caps receive a pressing force from the fiber bundle wound on the external surface of the liner, adhesion between the boundary gap of the tapered shape and the tapered convex section entering it is increased. Accordingly, an effect of suppressing entry of the thermosetting resin into the boundary portion can be increased.

In the method of manufacturing the high pressure gas tank of any one of the above-mentioned aspects, the caps may have guides configured to suppress a positional deviation in a fiber bundle width direction of the fiber bundle wound when the helical winding layer is formed first, along a winding path of the fiber bundle in the helical winding layer. In this way, when the helical winding layer is formed first, since the fiber bundle can be wound with no positional deviation in the width direction, the deviation of the cap according to the positional deviation of the fiber bundle can be suppressed.

In the method of manufacturing the high pressure gas tank of the above-mentioned aspect, hoop winding may be performed after helical winding of the fiber layer after the helical winding layer that is formed first.

Further, the present disclosure can be realized as various types, and for example, can be realized as a type such as an apparatus for manufacturing a high pressure gas tank by winding a fiber bundle on an external surface of a cylindrical liner and forming a fiber layer on the liner, or as a high pressure gas tank including a fiber layer formed by mounting nozzles on apexes of dome sections of both ends of a liner in an axial direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a half cross-sectional view for describing a configuration of a liner;

FIG. 2B is a front view for describing the configuration of the liner;

FIG. 2C is an enlarged view of a portion for describing the configuration of the liner;

FIG. 8 is a view for schematically describing an aspect of winding of resin-impregnated carbon fiber bundles wound first and second in helical winding of a low angle;

DETAILED DESCRIPTION OF EMBODIMENTS

Figure 1A:
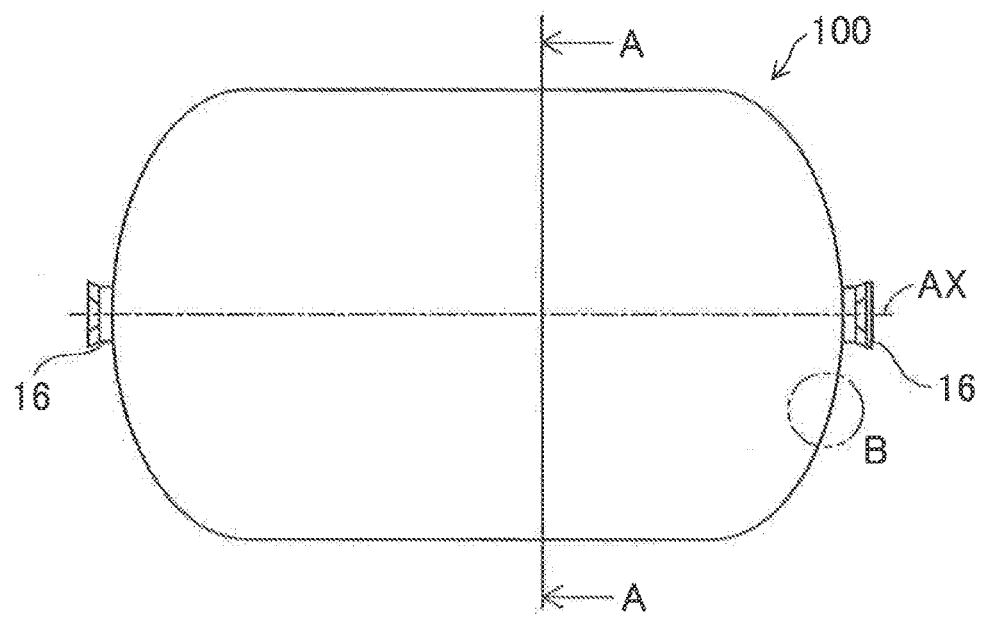
FIG. 1A is a view for describing an exterior of a configuration of a high pressure gas tank obtained by a tank manufacturing method according to an embodiment of the present disclosure.
Figure 1B:
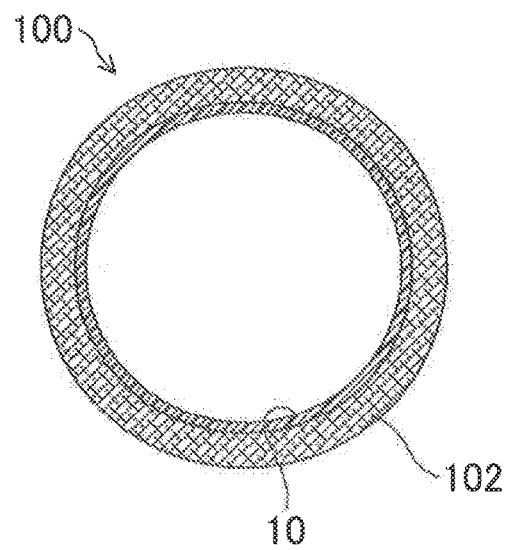
FIG. 1B is a cross-sectional view for describing the configuration of the high pressure gas tank obtained by the tank manufacturing method according to the embodiment of the present disclosure.
Figure 1C:
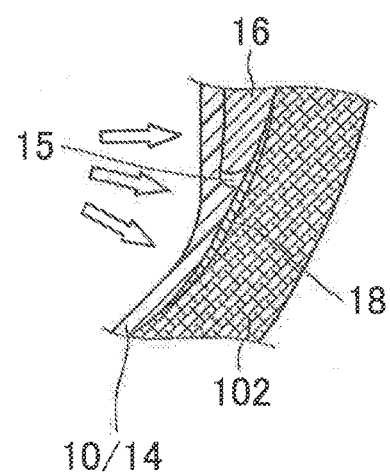
FIG. 1C is a partially enlarged cross-sectional view for describing the configuration of the high pressure gas tank obtained by the tank manufacturing method according to the embodiment of the present disclosure.

FIGS. 1A to 1C are views for describing a configuration of a high pressure gas tank 100 obtained by a tank manufacturing method according to an embodiment of the present disclosure, showing an exterior thereof, a cross-sectional view (a cross section taken along line A-A of FIG. 1A) and a partially enlarged cross-sectional view (a portion B of FIG. 1A), and FIGS. 2A to 2C are views for describing a configuration of a liner 10, showing a half cross-sectional view, a front view and an enlarged view of a portion (a portion B of FIG. 2A).

As shown, the high pressure gas tank 100 is configured to coat the liner 10 with a fiber reinforced resin layer 102, and nozzles 16 protrude from both ends thereof. The fiber reinforced resin layer 102 is formed by winding a fiber bundle impregnated with a thermosetting resin on an outer surface of the liner through a FW method, which will be described below.

The liner 10 is a hollow tank container and a bonded product of a pair of liner parts, which are divided into two halves at a center in a tank longitudinal direction. The two divided liner parts are die-formed of an appropriate resin such as a nylon-based resin or the like, the liner parts of the die-formed product are bonded and the bonded spot is laser-welded to form the liner 10. Through the bonding of the parts, the liner 10 includes spherical dome sections 14 formed at both sides of a cylinder section 12 having a cylindrical shape. The liner 10 includes pedestal sections (bottomed depressed pedestal sections) 14r having concave surfaces on which nozzles are mounted on apexes of the dome sections 14 with outer surfaces formed along an uniform stress surface, i.e., at both ends in an axial direction along an axis of a liner axis AX, and has a through-hole 14h formed in a center thereof coaxially with the liner axis AX.

Each of the nozzles 16 mounted on the apexes of the dome sections 14 at both ends in the axial direction along the liner axis AX is formed of a metal, and includes a nozzle flange 16f that enters the pedestal section 14r, a nozzle main body 16b protruding from the flange to a liner end side, a convex section 16t protruding from the nozzle flange 16f toward the inside of the liner, and a valve connecting hole 16h, While the nozzles 16 of both sides are common in a basic structure including an exterior, the nozzles 16 are distinguished from each other in that one of the nozzles 16 includes the valve connecting hole 16h as a through-hole, and the other nozzle 16 has the bottomed valve connecting hole 16h and a bottomed hole 16i concentric with the valve connecting hole 16*h* and disposed inside the liner. The convex section 16*t* is fitted into the through-hole 14*h* of the dome section 14 to position the nozzle 16 with respect to the liner 10. Further, the valve connecting hole 16*h* has a tapered screw section having a high pressure seal specification and configured to be connected to a pipeline at an opening side thereof.

The nozzle flange 16*f* is formed such that a flange bottom surface is planar and an outer surface has an arcuate shape. Accordingly, an outer circumferential edge 16*fe* of the nozzle flange 16*f* has a flange thickness that is reduced outward. An opening concave spot 15 is formed between the nozzle flange 16*f* and a concave spot inner circumferential wall 14*rs* of the pedestal section 14*r*. The opening concave spot 15 is a wedge-shaped concave spot widely opened toward a liner end side, and becomes the nozzle flange 16*f* that enters the pedestal section 14*r*, i.e., a gap of a boundary portion (a boundary gap) between the outer circumferential edge 16*fe* of the flange and the pedestal section 14*r*. In this case, as shown in FIG. 2C, the concave spot inner circumferential wall 14*rs* of the dome section 14 is formed to meander in a rectangular wave form around the axis of the liner 10 to surround the liner axis AX, and the nozzle flange 16*f* meanders such that the outer circumferential edge 16*fe* coincides with a meandering shape of the concave spot inner circumferential wall 14*rs*. For this reason, the opening concave spot 15 surrounds the liner axis AX while meandering.

A cap 18 is a die-formed product die-formed of the same resin as the liner 10, for example, a nylon-based resin, in a ring shape having a thin cross section with a maximum thickness of 1 mm or less, preferably, about 0.3 to 0.5 mm, and has the same linear expansion coefficient as the liner 10. The cap 18 covers a flange outer surface and a dome outer surface from the outer circumferential edge 16*fe* of the nozzle flange 16*f* to the dome section 14. The dome section 14 has an outer surface (hereinafter referred to as a dome outer surface) that is formed as a curved surface along an uniform stress surface, and the nozzle 16 has an outer surface (hereinafter referred to as a flange outer surface) of the outer circumferential edge 16*fe* of the nozzle flange 16*f* within a range covered by at least the cap 18, which is formed as an uniform stress surface continuous with the dome outer surface along the uniform stress surface of the dome section 14. The cap 18 has the dome outer surface of the dome section 14 along the uniform stress surface and an inner surface along a curved surface shape of the flange outer surface of the nozzle flange 16*f* continuous with the outer surface along the uniform stress surface. Accordingly, the cap 18 is adhered to the flange outer surface and dome outer surface from the outer circumferential edge 16*fe* of the nozzle flange 16*f* to the dome section 14 in a state in which the opening concave spot 15 having a meandering trajectory is covered.

The high pressure gas tank 100 obtained by the manufacturing method of the embodiment is provided by forming the fiber reinforced resin layer 102 on an external surface of the liner 10 including an external surface of the cap 18 in a state in which the opening concave spot 15 surrounding the liner axis AX is covered by the ring (ring-shaped) cap 18 while meandering as described above. The fiber reinforced resin layer 102 is formed separately with fiber winding by hoop winding and fiber winding by helical winding of a low angle and a high angle through a FW method, which will be described below. In forming the fiber reinforced resin layer 102, while an epoxy resin is generally used as a thermosetting resin, a thermosetting resin such as a polyester resin, a polyamide resin, or the like, may be used.

Figure 3:
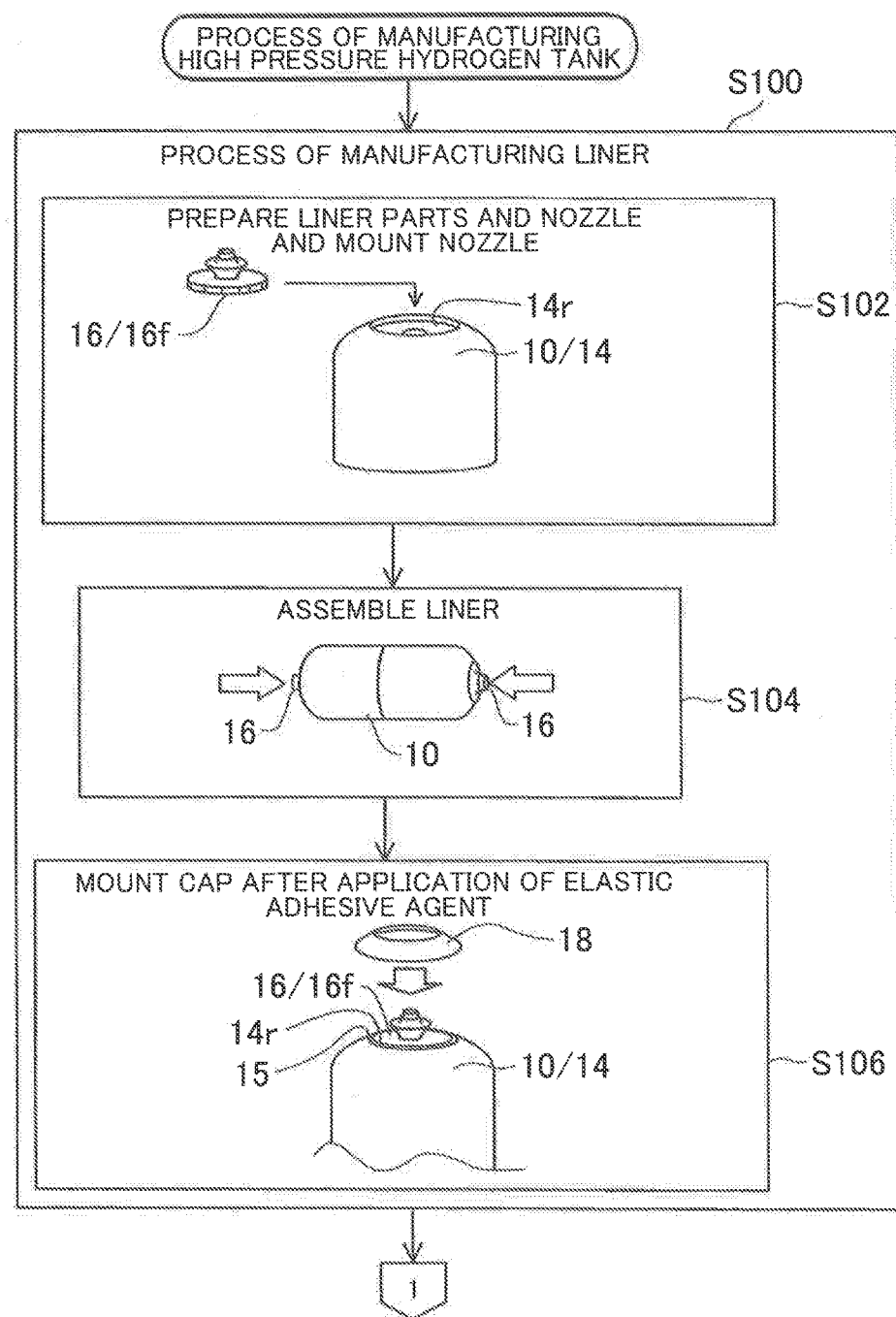
FIG. 3 is a process view showing a first half of a process of manufacturing a high pressure gas tank.
Figure 4:
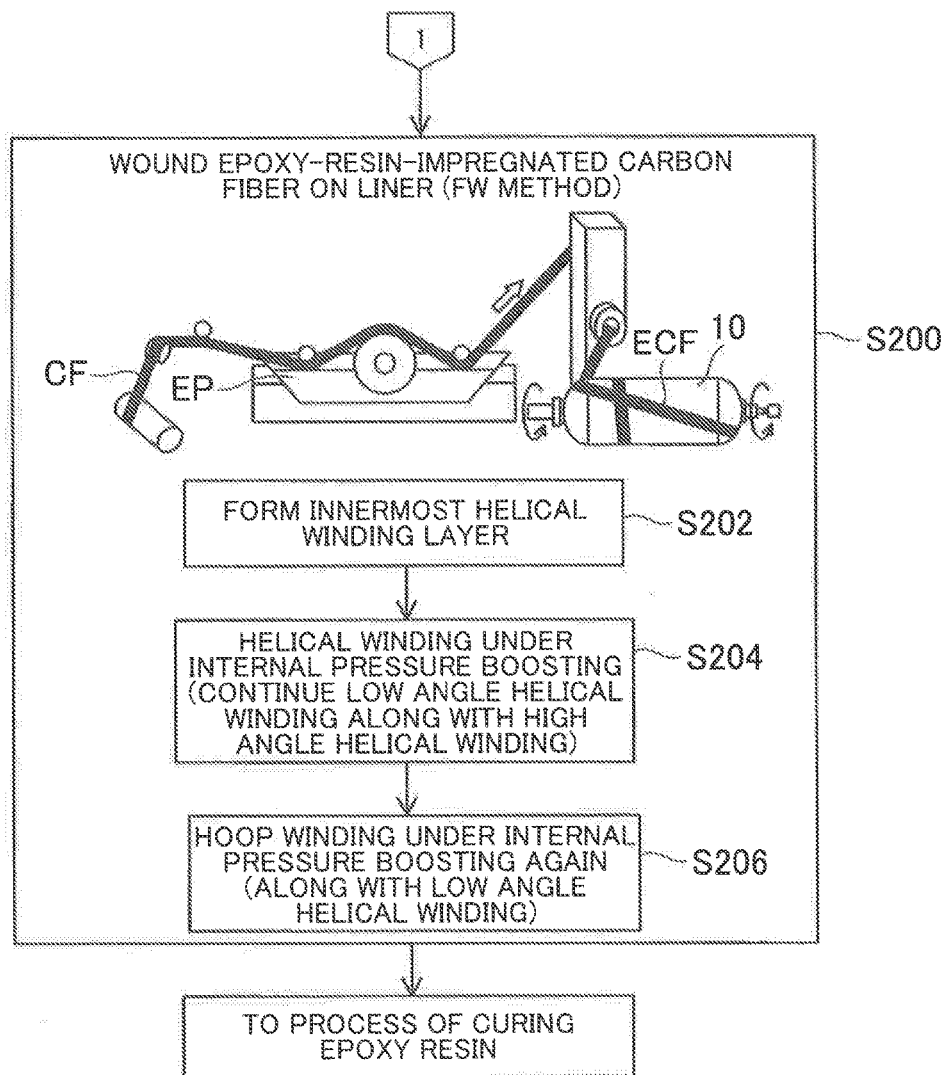
FIG. 4 is a process view showing a second half of the process of manufacturing the high pressure gas tank.

Next, a method of manufacturing a high pressure gas tank 100 according to the embodiment will be described. FIG. 3 is a process view showing a first half of a process of manufacturing the high pressure gas tank 100, and FIG. 4 is a process view showing a second half of a process of manufacturing the high pressure gas tank 100. First, the liner 10 is manufactured and prepared (process S100). In manufacturing the liner, in a state in which a pair of liner parts serving as resin-formed products and the nozzles 16 having the above-mentioned configuration are prepared, the nozzles 16 are assembled to the dome sections 14 of the liner parts (process S102). Specifically, in a state in which the nozzle flanges 16*f* of the nozzles 16 enter the pedestal sections 14*r* of the dome sections 14 in the liner parts, the convex sections 16*t* of the nozzles 16 are fitted into the through-holes 14*h* of the dome sections 14. Accordingly, the nozzles 16 are positioned at the dome sections 14 and mounted on the dome sections 14, and the liner parts having the nozzles 16 at the dome section apexes are obtained. In the liner parts, the opening concave spots 15 are formed between the outer circumferential edges 16*fe* of the nozzle flanges 16*f* in the mounted nozzles 16 and the concave spot inner circumferential walls 14*rs* of the pedestal sections 14*r*.

Figure 5:
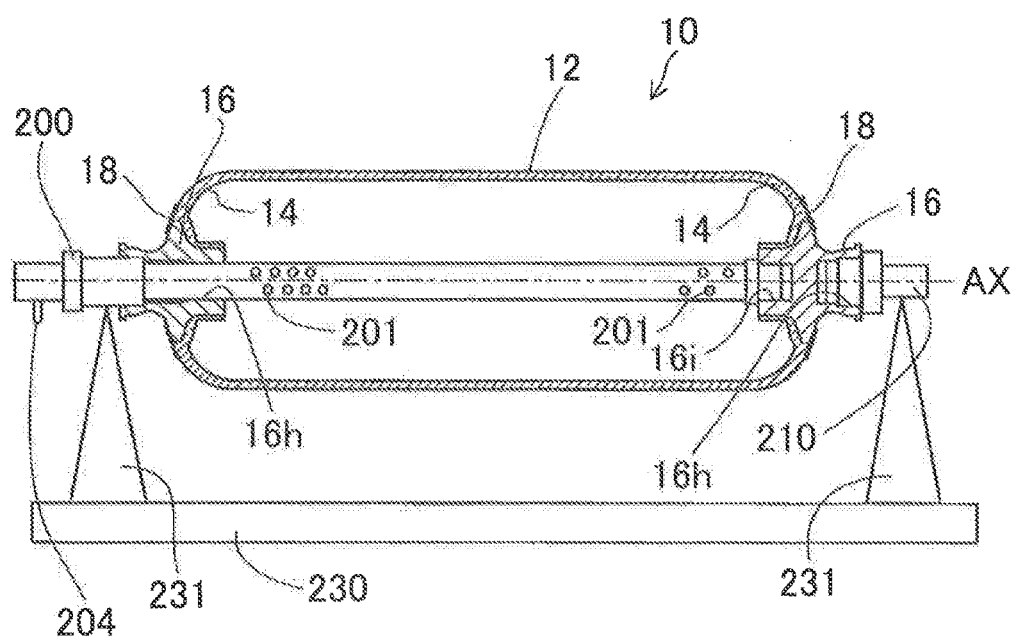
FIG. 5 is a view for describing an aspect of a preparation procedure when a fiber reinforced resin layer is formed.

Next, the pair of liner parts on which the nozzles 16 are mounted at both end sides are assembled by bonding the liner parts to the cylinder section 12 and laser-welding the bonded spots (process S104). Accordingly, the liner 10 with the nozzles 16 mounted on both ends is obtained. Next, in the dome sections 14 of the obtained liner 10, specifically, the caps 18 are mounted in boundary areas between the dome sections 14 and the nozzle flanges 16*f* of the nozzles 16 entering the pedestal sections 14*r* (process S106). Before each of the caps is mounted, a modified silicon-based or urethane-resin-based elastic adhesive agent is applied to at least one of the dome outer surface of the dome section 14 around the pedestal section 14*r* and the flange outer surface close to the outer circumferential edge 16*fe* in the nozzle flange 16*f* entering the pedestal section 14*r*, and the cap 18 is mounted after application of the adhesive agent. Once the cap is mounted, the opening concave spot 15 serving as a gap of the boundary area between the dome section 14 and the nozzle flange 16*f* of the nozzle 16 entering the pedestal section 14*r* is covered by the cap 18 around the liner axis AX. The applied elastic adhesive agent is cured for about several minutes to be adhered to the cap 18. According to the above-mentioned liner manufacturing process, manufacture and preparation of the liner 10 are completed, the obtained liner 10 includes the dome sections 14 having spherical dome outer surfaces along the uniform stress surfaces formed at both sides of the cylinder section 12 having a cylindrical shape, and the nozzles 16 are mounted on the apexes of the dome sections As shown in FIG. 4, when the liner 10 is obtained, the fiber reinforced resin layer 102 is formed on the external surface of the liner 10 through the FW method (process S200). FIG. 5 is a view for describing an aspect of a preparation procedure when the fiber reinforced resin layer 102 is formed. In forming the fiber reinforced resin layer of process S200, first, the nozzles 16 are mounted on the dome sections 14 of both ends and various jigs are also mounted on the caps 18 in the mounted liner 10. The mounted jigs are a long bearing jig 200, a short bearing jig 210 and a rolling bearing jig 230.

The long bearing jig 200 is inserted into the valve connecting hole 16*h* of one of the nozzles 16 while securing sealability, and a jig tip enters the bottomed hole 16*i* in the liner of the other the nozzle 16. The short bearing jig 210 is inserted into the valve connecting hole 16h outside the liner of the other nozzle 16 while securing sealability, and the long bearing jig 200 and the short bearing jig 210 catch the liner 10 at both ends, and function as bearings around a rotation axis of the liner 10. The long bearing jig 200 has a plurality of air discharge ports 201 disposed in rows in an axial direction in a tubular area in the liner, and an air coupler 204 installed outside the liner. The air coupler 204 is connected to a compressor (not shown), and pressurized air pumped by the compressor is introduced into the liner from the air discharge ports 201 via an air conduit (not shown) formed in the axial direction of the short bearing jig 210. The air coupler 204 is mounted on the long bearing jig 200 such that there is no interference with rotation of the long bearing jig 200 integrated with the liner 10 and a rolling bearing. Supply of the pressurized air will be described below.

The rolling bearing jig 230 includes a bearing leg 231, the long bearing jig 200 and the short bearing jig 210 of both sides of the liner 10 are journaled by the bearing legs 231, and the liner 10 rotated by rotation of a motor (not shown) is rotatably supported around the liner axis AX. Further, in FIG. 5, while an aspect of axial support of the bearing legs 231 is schematically shown, the bearing legs 231 axially support the liner 10 using roller bearings or the like without axial shaking. Thus, the fiber reinforced resin layer 102 is formed on the liner 10 axially supported by various jigs through the FW method in the following sequence.

Figure 6:
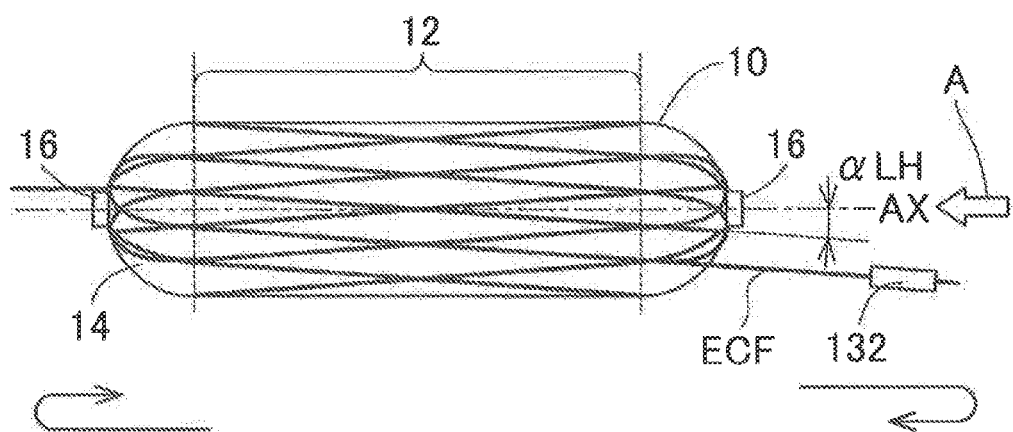
FIG. 6 is a view for schematically describing an aspect of formation of an innermost helical winding layer.
Figure 7:
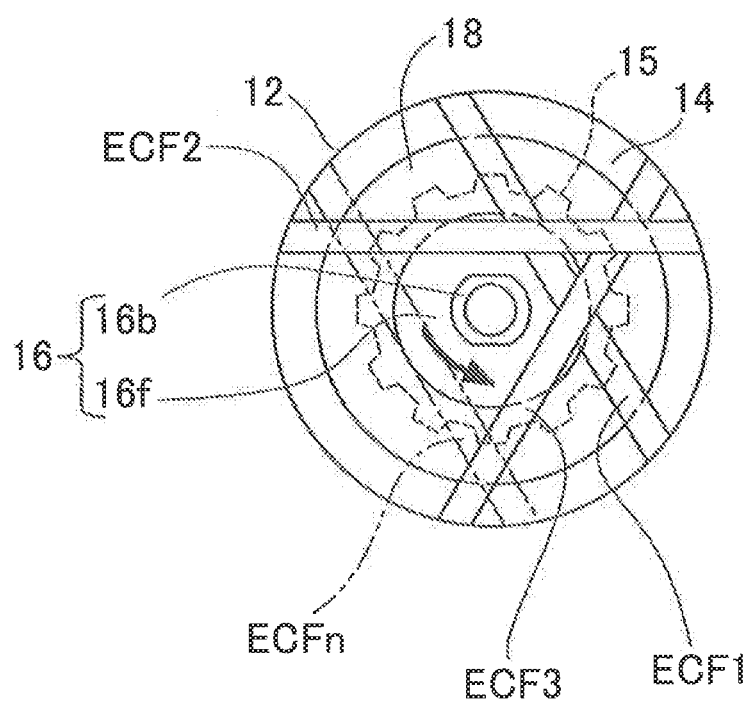
FIG. 7 is a view for schematically describing an aspect of formation of the innermost helical winding layer when seen from an arrow A direction of FIG. 6.

In forming the fiber reinforced resin layer 102 in process S200 shown in FIG. 4, the liner 10 on which the long bearing jig 200 and the short bearing jig 210 are mounted is rotated about the liner axis AX while being axially supported by the rolling bearing jig 230, and a carbon fiber bundle CF impregnated with an epoxy resin EP (hereinafter referred to as a resin-impregnated carbon fiber bundle ECF) is repeatedly wound on the external surface of the liner 10 that is rotated. In the method of manufacturing the high pressure gas tank 100 of the embodiment, when the fiber reinforced resin layer 102 is formed, an innermost helical winding layer closely attached to the external surface of the liner 10 is formed earlier (process S202). When the innermost helical winding layer is formed, the long bearing jig 200 guides the pressurized air pumped by the compressor into the liner 10 that is rotated via the air coupler 204 and the air discharge ports 201, and adjusts a liner internal pressure to an initial internal pressure of 0.1 MPa. FIG. 6 is a view for schematically showing an aspect of formation of the innermost helical winding layer (process S202: forming the innermost helical winding layer (low angle helical winding)), and FIG. 7 is a view for schematically showing the aspect of formation of the innermost helical winding layer when seen in the arrow A direction of FIG. 6. Further, in FIG. 7, in order to represent a sequence of the resin-impregnated carbon fiber bundle ECF that is wound, suffixes are attached to the resin-impregnated carbon fiber bundle ECF.

The innermost helical winding layer formed in process S202 is formed by helical winding of a low fiber angle αLH (for example, about 11 to 25°) formed between the resin-impregnated carbon fiber bundle ECF and the liner axis AX. More specifically; in the helical winding of the low angle to form the innermost helical winding layer, while the liner 10 is rotated about the liner axis AX using a region of the dome outer surface along the uniform stress surface of the dome section 14 on which the cap 18 is mounted (see FIG. 5) and a region of the outer surface of the cylinder section 12 as a target of the fiber bundle winding, a rotational speed of the liner and a reciprocal moving speed of the fiber delivery section 132 are adjusted such that the resin-impregnated carbon fiber bundle ECF extending from a fiber delivery section 132 serving as a supply source of the resin-impregnated carbon fiber bundle ECF is wound to cross the liner axis AX at the low fiber angle αLH (about 11 to 25°). Moreover, the fiber delivery section 132 is reciprocally moved in the liner axis AX direction, and the resin-impregnated carbon fiber bundle ECF is spirally wound repeatedly to be disposed (bridged) on the dome sections 14 of both ends of the cylinder section 12. In this case, in the dome sections 14 of both sides, a winding direction of the fiber bundle is turned according to switching of an outward path and a return path of the fiber delivery section 132, and a turning position from the liner axis AX is also adjusted.

As the turning of the winding direction of the dome sections 14 is repeated a plurality of times, the innermost helical winding layer over which the resin-impregnated carbon fiber bundle ECF is stretched and wound at the low fiber angle αLH is formed on the outer surface of the liner 10. In this case, the winding of the resin-impregnated carbon fiber bundle ECF is repeated until substantially the entire external surface of the dome section 14, specifically, the external surface of the mounted cap 18 is covered with carbon fiber bundles from a resin-impregnated carbon fiber bundle ECF1 that is wound first to a resin-impregnated carbon fiber bundle ECFn that is wound last.

In the innermost helical winding layer, since the resin-impregnated carbon fiber bundle ECF is helically wound at a low angle, the resin-impregnated carbon fiber bundle ECF is disposed on the dome sections 14 to cover the dome sections 14 including the nozzle flanges 16f of the nozzles 16 and the caps 18, and sequentially wound to push the caps 18 against the nozzle flanges 16f and the dome sections 14. In the method of manufacturing the high pressure gas tank 100 of the embodiment, as a rotational speed of the liner 10, a reciprocal moving speed of the fiber delivery section 132 and timing of reciprocal switching are adjusted, the winding of the resin-impregnated carbon fiber bundle ECF of the innermost helical winding layer is defined as follows. FIG. 8 is a view for schematically showing an aspect of winding of resin-impregnated carbon fiber bundles that are wound first and second through helical winding of a low angle.

In the helical winding of the low angle to form the innermost helical winding layer, in manufacture and design of a tank on which the caps 18 are mounted, the resin-impregnated carbon fiber bundle ECF crosses the liner axis AX at the low fiber angle αLH (about 11 to 25°), and a centerline ECFc of the resin-impregnated carbon fiber bundle ECF coincides with a theoretical line PLc defined on the uniform stress surface (the uniform stress surface is shown) formed along the outer surface of the dome section 14. However, even though the rotational speed of the liner 10 or the reciprocating speed and reciprocal movement switching timing of the fiber delivery section 132 during fiber bundle winding was adjusted to coincide with the theoretical line PLc defined by the centerline ECFc of the resin-impregnated carbon fiber bundle ECF and the uniform stress surface, an influence of tension applied to the resin-impregnated carbon fiber bundle ECF, a resin impregnation amount, or the like, is received, and the centerline ECFc of the resin-impregnated carbon fiber bundle ECF may deviate from the theoretical line PLc defined by the uniform stress surface. In FIG. 8, the centerline ECFc of the resin-impregnated carbon fiber bundle ECF is shown as deviating toward the outside of the liner as shown by a white arrow in the drawings.

When the centerline ECFc of the resin-impregnated carbon fiber bundle ECF is deviated from the theoretical line PLc defined on the uniform stress surface and the resin-impregnated carbon fiber bundle ECF is wound, for example, as shown in FIG. 8, the resin-impregnated carbon fiber bundle ECF can be deviated outside the liner even in the helical winding of the low angle due to a deviation Cz (see FIG. 8) of the centerline. It is assumed that wrinkles can occur from the mounted cap 18 on the dome section 14 due to the deviation of the fiber bundle. Accordingly, in the method of manufacturing the high pressure gas tank 100 of the embodiment, the rotational speed of the liner 10 or the reciprocating speed and the reciprocal movement switching timing of the fiber delivery section 132 during the fiber bundle winding are appropriately adjusted such that the deviation Cz between the centerline ECFc of the resin-impregnated carbon fiber bundle ECF and the theoretical line PLc defined on the uniform stress surface is within a half of a width (a fiber bundle width ECFw) of the resin-impregnated carbon fiber bundle ECF (the deviation Cz is within a half of a width (the fiber bundle width ECFw) of resin-impregnated carbon fiber bundle ECF), and the helical winding of the low angle is repeated a predetermined number of times to be the deviation Cz or less (within the deviation Cz). Accordingly, the resin-impregnated carbon fiber bundle ECF1 that is wound first, the resin-impregnated carbon fiber bundle ECF2 that is wound second, and the resin-impregnated carbon fiber bundles ECF3 to ECFn (the suffix n represents an integer) that are wound after that are sequentially wound such that the deviation Cz is within a half of the fiber bundle width ECFw, and thus the innermost helical winding layer is formed. Further, it is more preferable that the resin-impregnated carbon fiber bundles ECF that are sequentially wound be imaged by a digital optical camera to obtain a level of the deviation Cz between the centerline ECFc of the resin-impregnated carbon fiber bundle ECF and the theoretical line PLc defined on the uniform stress surface, and that the rotational speed of the liner 10 or the reciprocating speed and the reciprocal movement switching timing of the fiber delivery section 132 during fiber bundle winding be appropriately adjusted according to the level of the deviation.

After the innermost helical winding layer is formed in the above-mentioned process S202, the helical winding of the low angle is continued in a state in which an internal pressure of the liner 10 is boosted (process S204), and then hoop winding (process S206) is performed in the state in which the internal pressure is further boosted. In process S204, the pressurized air pumped by the compressor is guided into the liner 10 that is rotated again via the air coupler 204 and the air discharge ports 201, the liner internal pressure is adjusted to be boosted to a primary internal pressure (0.5 MPa) higher than the initial internal pressure (0.1 MPa), and the helical winding of the low angle is continued in the boosting-adjusted state. Then, the helical winding of the high angle is used together during continuation of the helical winding of the low angle in process S204 at an appropriate interval. The helical winding of the high angle is performed by appropriately adjusting the rotational speed of the liner 10 or the reciprocating speed and the reciprocal movement switching timing of the fiber delivery section 132 such that an angle formed between the resin-impregnated carbon fiber bundle ECF and the liner axis AX becomes the high fiber angle (for example, about 30 to 60°). As the helical winding of the low angle is continued along with the helical winding of the high angle, in a state in which the internal pressure of the liner 10 including the inside of the dome section 14 is adjusted to be boosted to the primary internal pressure (0.5 MPa), the cap 18 of the dome section 14 is covered with the resin-impregnated carbon fiber bundle ECF.

In process S206 in which the helical winding of the low angle in process S204 is continued, the pressurized air pumped by the compressor is guided into the liner 10 that is rotated again via the air coupler 204 and the air discharge ports 201, the liner internal pressure is adjusted to be boosted to a secondary internal pressure (0.8 MPa) higher than the primary internal pressure (0.5 MPa), and the hoop winding is performed in the boosting-adjusted state. Then, the hoop winding in process S206 is performed by appropriately adjusting the rotational speed of the liner 10 or the reciprocating speed and the reciprocal movement switching timing of the fiber delivery section 132 such that the resin-impregnated carbon fiber bundle ECF is wound to cross the liner axis AX at a substantially perpendicular winding angle (a fiber angle $\alpha 0$: for example, about 89°). When the helical winding of the low angle is performed together at an appropriate interval while the hoop winding is repeated a predetermined number of times, the caps 18 are covered with the resin-impregnated carbon fiber bundle ECF in the state in which the pressure is adjusted to be boosted to the secondary internal pressure (0.8 MPa) at the sides of the dome sections 14. Further, in the hoop winding of process S206, the helical winding of the low angle may be omitted.

The number of windings of the fiber bundle in the helical winding of the low angle along with the helical winding of the high angle in process S204 or the number of windings of the fiber bundle of the hoop winding in process S206 and the switching timing of the hoop winding are set in consideration of a layer thickness of the fiber reinforced resin layer 102 obtained on the high pressure gas tank 100 serving as a finished product. The fiber reinforced resin layer in a state in which the epoxy resin EP in the resin-impregnated carbon fiber bundle ECF is uncured is formed on the external surface of the liner 10 by the winding of the resin-impregnated carbon fiber bundle ECF in the above-mentioned processes S202 to S206, and the high pressure gas tank serving as a semi-finished product in which the fiber reinforced resin layer is uncured is obtained. Further, the high pressure gas tank serving as the semi-finished product is in a state in which the fiber reinforced resin layer is uncured, and an exterior of the tank is the same as that of the high pressure gas tank 100.

The obtained high pressure gas tank serving as the semi-finished product is conveyed to a process of curing the epoxy resin EP and is subjected to resin heating processing while being axially supported by the long bearing jig 200 or the short bearing jig 210 and the rolling bearing jig 230. According to the heating processing, the epoxy resin EP in the resin-impregnated carbon fiber bundle ECF is cured, the fiber reinforced resin layer 102 formed of a carbon fiber reinforced plastic (CFRP) is formed, and the high pressure gas tank 100 is completed through curing and cooling. Further, when resin heating processing is performed, a heating technique of performing induction heating using an induction heating coil configured to induce high frequency induction heating in addition to using a heating furnace in which a heater is installed can be used. In the high frequency induction heating, a rapid increase in temperature of the thermosetting resin can be achieved.

As described above, in the method of manufacturing the high pressure gas tank 100 of the embodiment, the nozzle flange 16f of the nozzle 16 entering the pedestal section 14r of the dome section 14, specifically, the opening concave spot 15 serving as a gap of a boundary portion between the outer circumferential edge 16fe of the flange and the dome section 14 is covered with the ring-shaped cap 18. Moreover, the cap 18 is covered with the resin-impregnated carbon fiber bundles ECF1 to ECFn repeatedly wound by the helical winding of the low angle to form the innermost helical winding layer (see FIGS. 7 and 8), and pushed against the dome outer surface and the flange outer surface. Accordingly, according to the method of manufacturing the high pressure gas tank 100 of the embodiment, entry of the epoxy resin EP into the opening concave spot 15 from the resin-impregnated carbon fiber bundle ECF can be conveniently suppressed by the cap 18.

In the method of manufacturing the high pressure gas tank 100 of the embodiment, the ring-shaped cap 18 that can be manufactured at a low cost through the conventional mold forming may be used, and there is no need to wait for the seal material to cure like a conventional method. Accordingly, according to the method of manufacturing the high pressure gas tank 100 of the embodiment, entry of the epoxy resin EP into the boundary portion can be suppressed at a low cost, and the high pressure gas tank 100 in which entry of the epoxy resin EP into the boundary portion is suppressed can be manufactured in a short time.

In the method of manufacturing the high pressure gas tank 100 of the embodiment, the cap 18 is a ring-shaped die-formed product with a thin cross section formed of the same nylon-based resin as the liner 10, having the same linear expansion coefficient as the liner 10, and having the dome outer surface of the dome section 14 along the uniform stress surface and the inner surface along the curved surface shape of the flange outer surface of the nozzle flange 16f continuous with the outer surface along the uniform stress surface. Accordingly, when the epoxy resin EP in the uncured fiber reinforced resin layer that is already formed from the resin-impregnated carbon fiber bundle ECF is heated and cured, damage of the cap 18 due to a difference in thermal expansion from the liner 10 can be suppressed, adhesion of the cap 18 to the dome outer surface of the dome section 14 and the flange outer surface of the nozzle flange 16f continued thereto can be increased. For this reason, according to the method of manufacturing the high pressure gas tank 100 of the embodiment, entry of the uncured epoxy resin EP into the opening concave spot 15 serving as the gap of the boundary portion from the damaged spot of the cap 18 or the gap between the cap 18 and the dome outer surface and the flange outer surface can be more reliably suppressed. Incidentally, when the epoxy resin EP in the uncured fiber reinforced resin layer is heated and cured, the high pressure gas tank 100 is cooled by a method such as gas discharge from the tank. Even when the cooling is performed, it is preferable if damage of the cap 18 due to a difference in thermal expansion from the liner 10 can be suppressed.

In the method of manufacturing the high pressure gas tank 100 of the embodiment, in forming the innermost helical winding layer configured to push the cap 18 against the dome outer surface of the dome section 14 or the flange outer surface of the nozzle flange 16f of the nozzle 16 using the resin-impregnated carbon fiber bundle ECF, the resin-impregnated carbon fiber bundle ECF1 that is wound first to the resin-impregnated carbon fiber bundle ECFn that is wound last and disposed on the dome sections 14 to cover the nozzle flanges 16f of the nozzles 16 and the caps 18 are wound such that the deviation Cz between the centerline ECFc of the resin-impregnated carbon fiber bundle ECF and the theoretical line PLc defined on the uniform stress surface is within a half of the fiber bundle width ECFw (see FIG. 8). When the deviation is defined in this way, wrinkles that are assumed to occur due to the deviation of the fiber bundle do not easily occur in the cap 18. Accordingly, according to the method of manufacturing the high pressure gas tank 100 of the embodiment, occurrence of the wrinkles in the cap 18 is also suppressed by suppression of the deviation of the resin-impregnated carbon fiber bundle ECF wound on the outer surface of the dome section 14, and entry of the uncured epoxy resin EP into the opening concave spot 15 serving as the gap of the boundary portion from an area of the wrinkles in the cap 18 can be reliably suppressed.

In the method of manufacturing the high pressure gas tank 100 of the embodiment, before the cap 18 is mounted to cover the opening concave spot 15 serving as the gap of the boundary portion between the dome section 14 and the nozzle flange 16f of the nozzle 16, the elastic adhesive agent is applied to at least one of the dome outer surface of the dome section 14 and the flange outer surface of the nozzle flange 16f, and the cap 18 is mounted after application of the adhesive agent. Accordingly, according to the method of manufacturing the high pressure gas tank 100 of the embodiment, a positional deviation of the cap 18 after the mounting is suppressed, and stabilization or reproducibility of a cap mounting position can be increased. In addition, according to the method of manufacturing the high pressure gas tank 100 of the embodiment, as the gap that may be generated in a cap inner surface side due to a tolerance in manufacturing the cap 18 is closed by an elastic adhesive agent, the uncured epoxy resin EP can be prevented from entering the opening concave spot 15 from the gap.

In the method of manufacturing the high pressure gas tank 100 of the embodiment, after the innermost helical winding layer is formed with the resin-impregnated carbon fiber bundles ECF1 to ECFn in the state in which the liner internal pressure is the initial internal pressure (0.1 MPa), continuation of the helical winding (process S204) in the state in which the internal pressure of the liner 10 is boosted to the primary internal pressure (0.5 MPa) higher than the initial internal pressure (0.1 MPa) and the hoop winding (process S206) in the state in which the liner internal pressure is boosted to the secondary internal pressure (0.8 MPa) higher than the primary internal pressure (0.5 MPa) are performed, and the fiber layers (the helical winding layer and the hoop winding layer) are formed after the innermost helical winding layer. Accordingly, according to the method of manufacturing the high pressure gas tank 100 of the embodiment, in a state in which the opening concave spot 15 serving as the gap of the boundary portion between the dome section 14 and the nozzle flange 16f of the nozzle 16 is covered, as a high pressure referred to as the primary internal pressure (0.5 MPa) or the secondary internal pressure (0.8 MPa) is applied to the cap 18 caught by the innermost helical winding layer from the liner 10 side, an effect of increasing sealability by covering the opening concave spot 15 with the cap 18 at a high surface pressure and suppressing entry of the uncured epoxy resin EP into the opening concave spot 15 can be further enhanced.

Figure 9A:
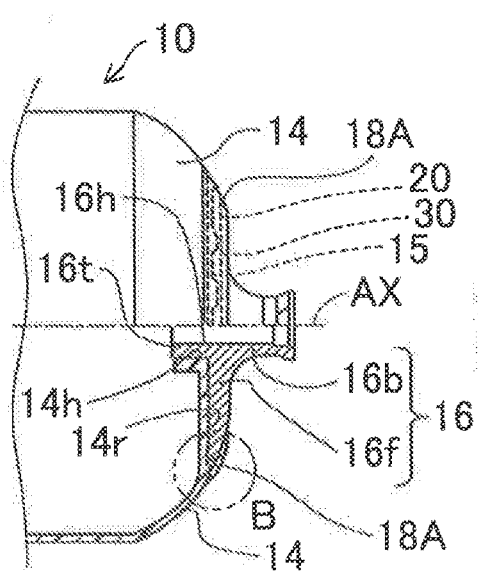
FIG. 9A is a half cross-sectional view for describing the liner using a cap of a first modified example.
Figure 9B:
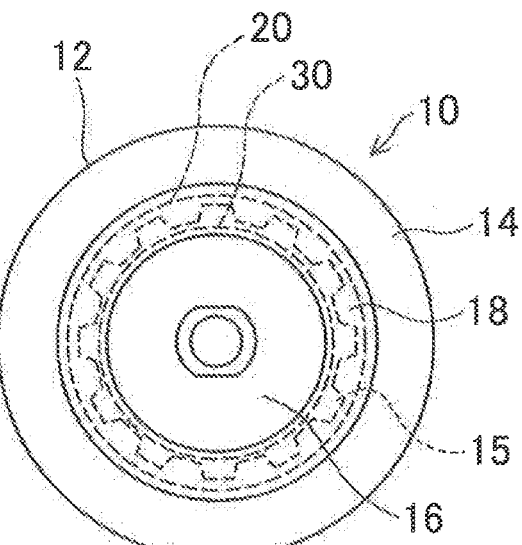
FIG. 9B is a front view and an enlarged view of a portion for describing the liner using the cap of the first modified example.
Figure 9C:
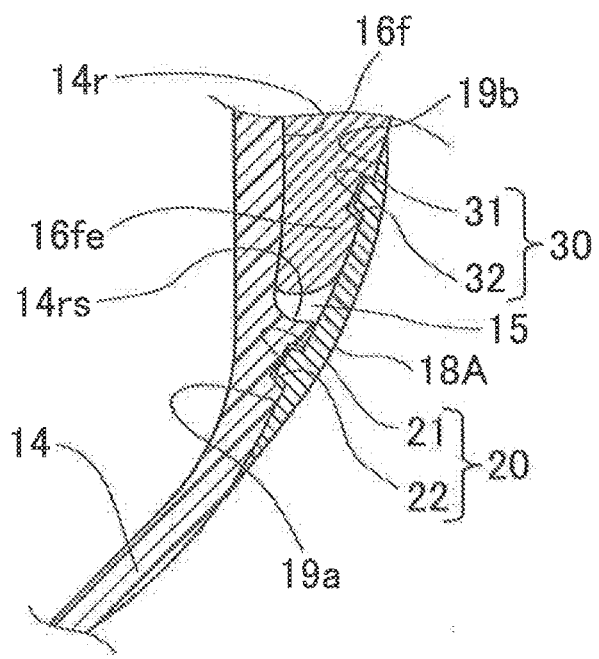
FIG. 9C is a partially enlarged view for describing the liner using the cap of the first modified example.

Next, in the tank manufacturing method according to the above-mentioned embodiment, a cap of a modified example that can be used instead of the cap 18 will be described. FIGS. 9A to 9C are views for describing the liner 10 using a cap 18A of a first modified example, showing a half cross-sectional view, a front view and an enlarged view of a portion (a portion B of FIG. 9A). The cap 18A of the modified example is mounted to cover the opening concave spot 15, and has a first cap-side convex section 21 formed at a liner-side inner circumferential surface 19a in contact with the outer surface of the dome section 14, and a second cap-side convex section 31 formed at a nozzle flange-side inner circumferential surface 19b in contact with the outer surface of the nozzle flange 16f. Either the liner-side inner circumferential surface 19a or the nozzle flange-side inner circumferential surface 19b is a cap inner circumferential surface, and the cap 18A has the first cap-side convex section 21 and the second cap-side convex section 31 as cap-side engaging sections.

The liner 10 on which the cap 18A is mounted has a first engaging concave section 22 configured to engage with the first cap-side convex section 21 at the dome section 14 as an engaging section configured to engage with the cap-side engaging section, and the nozzle 16 has a second engaging concave section 32 configured to engage with the second cap-side convex section 31 at the nozzle flange 16f as an engaging section configured to engage with the cap-side engaging section. The first cap-side convex section 21 and the first engaging concave section 22 are formed in a circular shape outside the opening concave spot 15, and a first cap engaging area 20 in which the first cap-side convex section 21 is engaged with the first engaging concave section 22 surrounds the outside of the opening concave spot 15. The second cap-side convex section 31 and the second engaging concave section 32 are formed in a circular shape inside the opening concave spot 15, and a second cap engaging area 30 in which the second cap-side convex section 31 is engaged with the second engaging concave section 32 surrounds the inside of the opening concave spot 15. Accordingly, according to the method of manufacturing the high pressure gas tank 100 using the cap 18A of the first modified example, the following advantages are provided.

In a process of forming the fiber reinforced resin layer 102 using the resin-impregnated carbon fiber bundle ECF, an epoxy resin serving as a thermosetting resin in the resin-impregnated carbon fiber bundle ECF may enter from a gap between the cap 18A and the outer surface of the dome section 14 or the gap between the cap 18A and the outer surface of the nozzle flange 16f. However, according to the method of manufacturing the high pressure gas tank 100 using the cap 18A of the first modified example, as the uncured epoxy resin entering from the gap is retained in the first cap engaging area 20 and the second cap engaging area 30, entry of the epoxy resin into the opening concave spot 15 can be suppressed with high effectiveness. In addition to the cap 18A being able to be positioned by the first cap engaging area 20 and the second cap engaging area 30, a positional deviation of the cap 18A when the resin-impregnated carbon fiber bundle ECF is wound can also be suppressed.

Figure 10A:
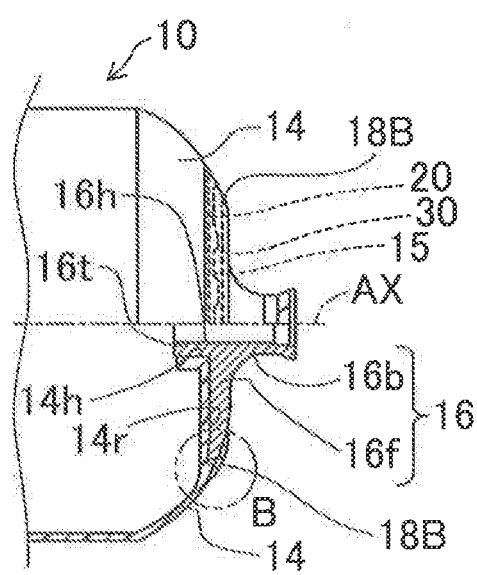
FIG. 10A is a half cross-sectional view for describing a liner using a cap of a second modified example.
Figure 10B:
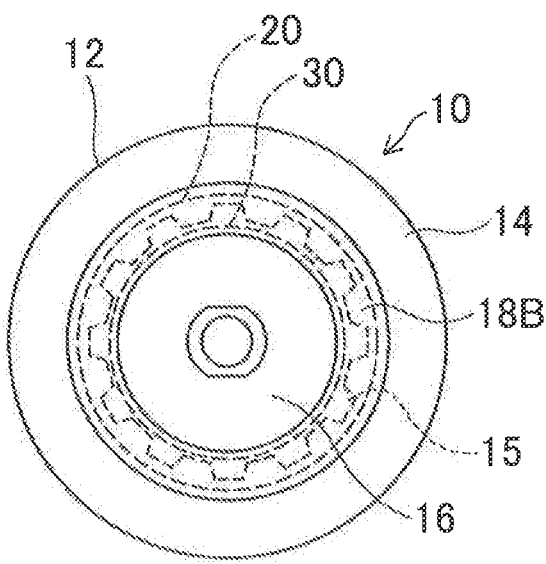
FIG. 10B is a front view for describing the liner using the cap of the second modified example.
Figure 10C:
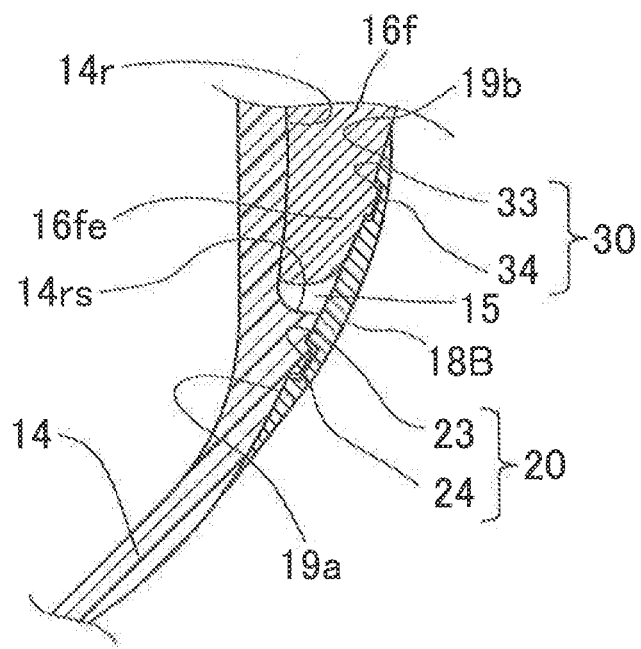
FIG. 10C is a partially enlarged view for describing the liner using the cap of the second modified example.

FIGS. 10A to 10C are views for describing the liner 10 using a cap 18B of a second modified example, showing a half cross-sectional view, a front view and an enlarged view of a portion (a portion B of FIG. 10A). The cap 18B of the modified example has a first cap-side concave section 23 formed in the liner-side inner circumferential surface 19a, and a second cap-side concave section 33 formed in the nozzle flange-side inner circumferential surface 19b. Then, the liner 10 on which the cap 18B is mounted has a first engaging convex section 24 configured to engage the first cap-side concave section 23 at the dome section 14, and the nozzle 16 has a second engaging convex section 34 configured to engage the second cap-side concave section 33 at the nozzle flange 16f. The first cap-side concave section 23 and the first engaging convex section 24 are formed in a circular shape outside the opening concave spot 15, and the first cap engaging area 20 in which the first engaging convex section 24 is engaged with the first cap-side concave section 23 surrounds the outside of the opening concave spot 15. The second cap-side concave section 33 and the second engaging convex section 34 are formed in a circular shape inside the opening concave spot 15, and the second cap engaging area 30 in which the second engaging convex section 34 is engaged with the second cap-side concave section 33 surrounds the inside of the opening concave spot 15. Accordingly, even by the method of manufacturing the high pressure gas tank 100 using the cap 18B of the second modified example, entry of the epoxy resin into the opening concave spot 15 can be suppressed with high effectiveness, and positioning of the cap 18B and positional deviation suppression can also be accomplished.

Figure 11A:
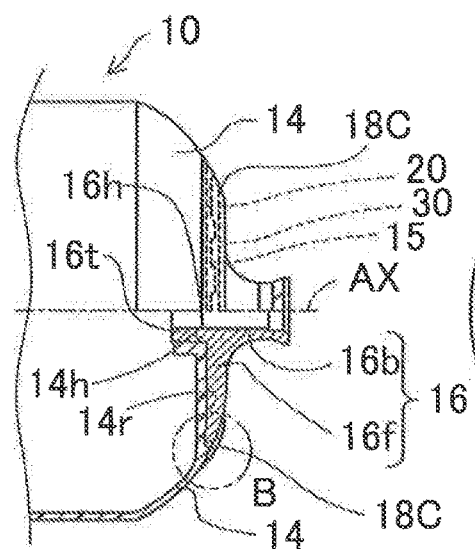
FIG. 11A is a half cross-sectional view for describing a liner using a cap of a third modified example.
Figure 11B:
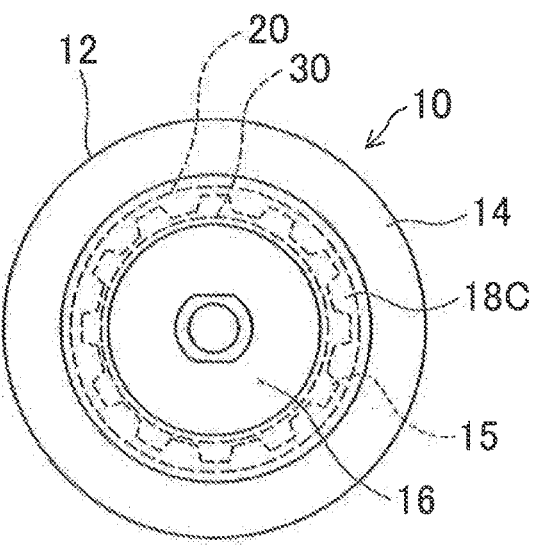
FIG. 11B is a front view for describing the liner using the cap of the third modified example.
Figure 11C:
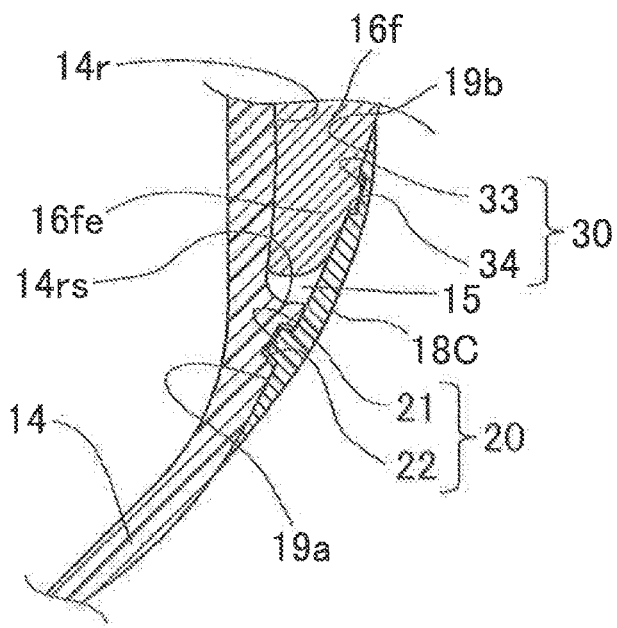
FIG. 11C is a partially enlarged view for describing the liner using the cap of the third modified example.

FIGS. 11A to 11C are views for describing the liner 10 using a cap 18C of a third modified example, showing a half cross-sectional view, a front view and an enlarged view of a portion (a portion B of FIG. 11A). The cap 18C of the modified example has the above-mentioned first cap-side convex section 21 formed at the liner-side inner circumferential surface 19a, and the above-mentioned second cap-side concave section 33 formed at the nozzle flange-side inner circumferential surface 19b. The liner 10 on which the cap 18C is mounted has the above-mentioned first engaging concave section 22 configured to engage with the first cap-side convex section 21 at the dome section 14, and the nozzle 16 has the above-mentioned second engaging convex section 34 configured to engage the second cap-side concave section 33 at the nozzle flange 16f. The first cap engaging area 20 in which the first engaging concave section 22 is engaged with the first cap-side convex section 21 surrounds the outside of the opening concave spot 15, and the second cap engaging area 30 in which the second engaging convex section 34 is engaged with the second cap-side concave section 33 surrounds the inside of the opening concave spot 15. Accordingly, even by the method of manufacturing the high pressure gas tank 100 using the cap 18C of the third modified example, entry of the epoxy resin into the opening concave spot 15 can be suppressed with high effectiveness, and positioning of the cap 18B or positional deviation suppression can also be accomplished. Further, in the modified example, the first cap engaging area 20 may be constituted by the first cap-side concave section 23 and the first engaging convex section 24 shown in FIG. 10C, and the second cap engaging area 30 may be constituted by the second cap-side convex section 31 and the second engaging concave section 32 shown in FIGS. 9A to 9C.

Figure 12A:
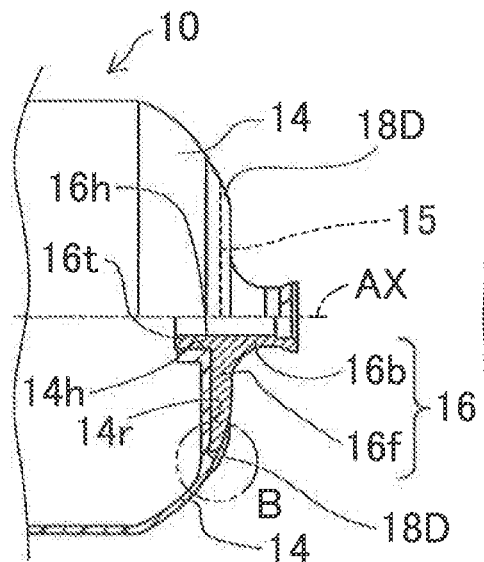
FIG. 12A is a half cross-sectional view for describing a liner using a cap of a fourth modified example.
Figure 12B:
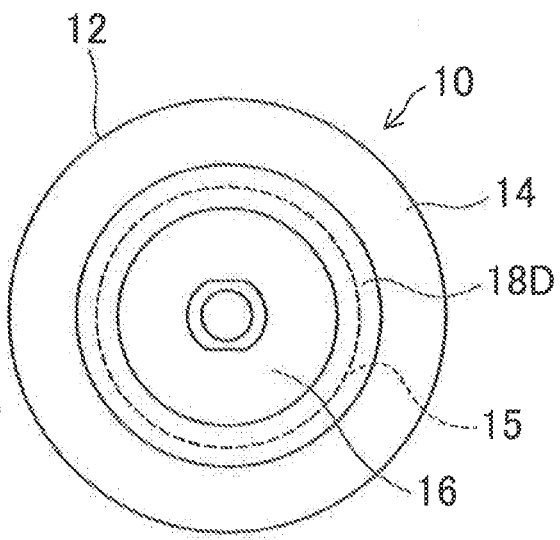
FIG. 12B is a front view for describing the liner using the cap of the fourth modified example.
Figure 12C:
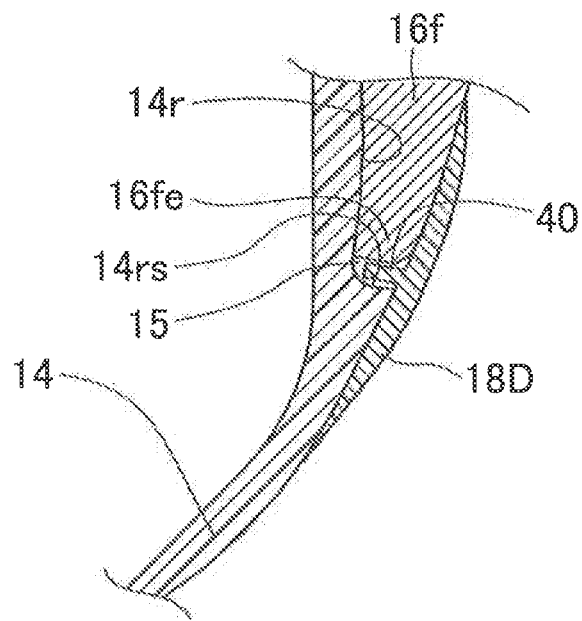
FIG. 12C is a partially enlarged view for describing the liner using the cap of the fourth modified example.
Figure 13:
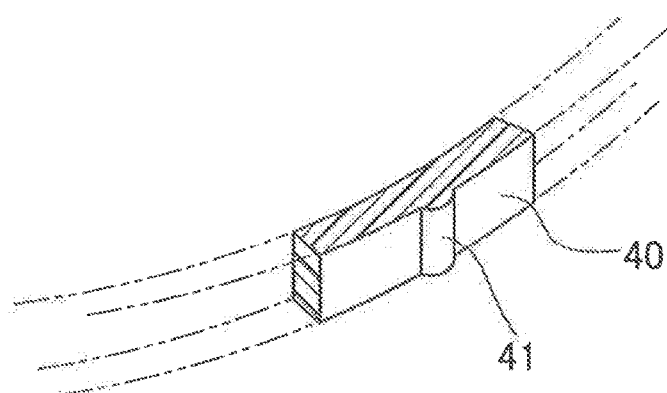
FIG. 13 is a view for schematically describing a boundary convex section included in the cap.

FIGS. 12A to 12C are views for describing the liner 10 using a cap 18D of a fourth modified example, showing a half cross-sectional view, a front view and an enlarged view of a portion (a portion B of FIG. 12A). FIG. 13 is a view for schematically describing a boundary convex section 40 formed in the cap 18D. The liner 10 on which the cap 18D of the modified example is mounted includes the opening concave spot 15 having a circular shape that surrounds the nozzle 16, and the cap 18D has the boundary convex section 40 entering the opening concave spot 15 serving as the boundary gap. The boundary convex section 40 is a thin annular body protruding from a cap inner circumferential surface serving as a lower surface of the cap 18D, and enters the opening concave spot 15 throughout the region of the opening concave spot 15. Even by the method of manufacturing the high pressure gas tank 100 using the cap 18D of the fourth modified example, since the boundary convex section 40 already enters the opening concave spot 15, entry of the epoxy resin into the opening concave spot 15 can be suppressed, and positioning of the cap 18D and positional deviation suppression can also be accomplished. In addition, as shown in FIG. 13, when a convex portion 41 is formed at the boundary convex section 40, rotation of the cap 18D around the liner axis AX can also be prevented by the convex portion 41. Further, when the opening concave spot 15 is a concave spot surrounding the liner axis by repeating a rectangular wave form as in the above-mentioned embodiment, the boundary convex section 40 may be a plate-shaped body curved to enter a partial area of the rectangular wave form.

Figure 14A:
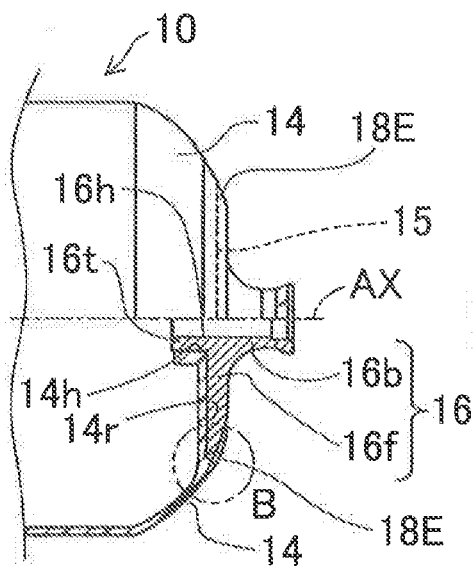
FIG. 14A is a half cross-sectional view for describing a liner using a cap of a fifth modified example.
Figure 14B:
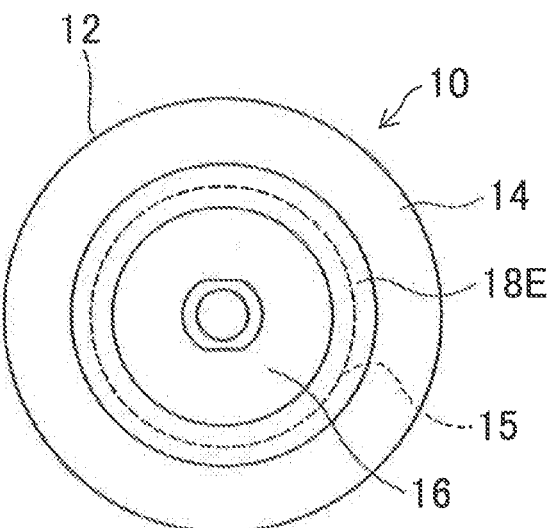
FIG. 14B is a front view for describing the liner using the cap of the fifth modified example.
Figure 14C:
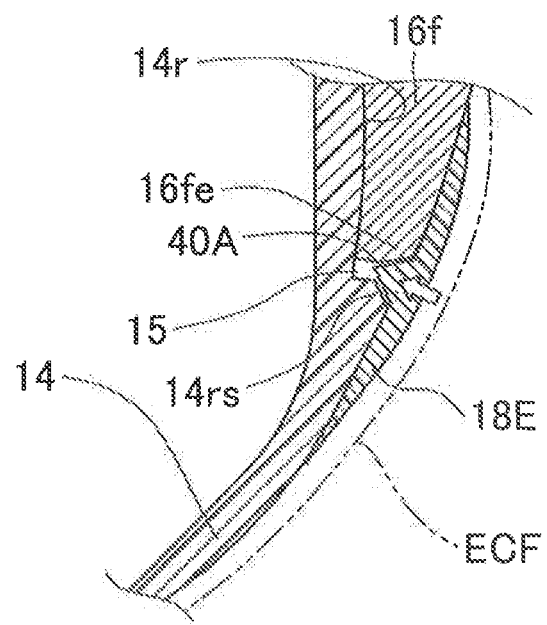
FIG. 14C is a partially enlarged view for describing the liner using the cap of the fifth modified example.

FIGS. 14A to 14C are views for describing the liner 10 using a cap 18E of a fifth modified example, showing a half cross-sectional view, a front view and an enlarged view of a portion. The liner 10 on which the cap 18E of the modified example is mounted and the nozzle 16 are formed with the concave spot inner circumferential wall 14rs and the outer circumferential edge 16fe in a tapered shape such that the opening concave spot 15 serving as the boundary gap widens toward the cap 18E. The cap 18E has the boundary convex section 40A as a tapered convex section along the tapered shape of the opening concave spot 15. The cap 18E of the modified example pushes the boundary convex section 40A against the opening concave spot 15 having the tapered shape with high adhesion since a pressing force is received from the resin-impregnated carbon fiber bundle ECF wound on the external surface of the liner 10 as shown by a white arrow in the drawings. Accordingly, according to the method of manufacturing the high pressure gas tank 100 using the cap 18E of the fifth modified example, entry of the epoxy resin into the opening concave spot 15 can be suppressed with higher effectiveness. Further, when the opening concave spot 15 is a concave spot surrounding the liner axis by repeating a rectangular wave form like the above-mentioned embodiment, the boundary convex section 40A may enter the opening concave spot 15 of the partial area while the opening concave spot 15 is formed in the tapered shape in the partial area of the rectangular wave form.

Figure 15:
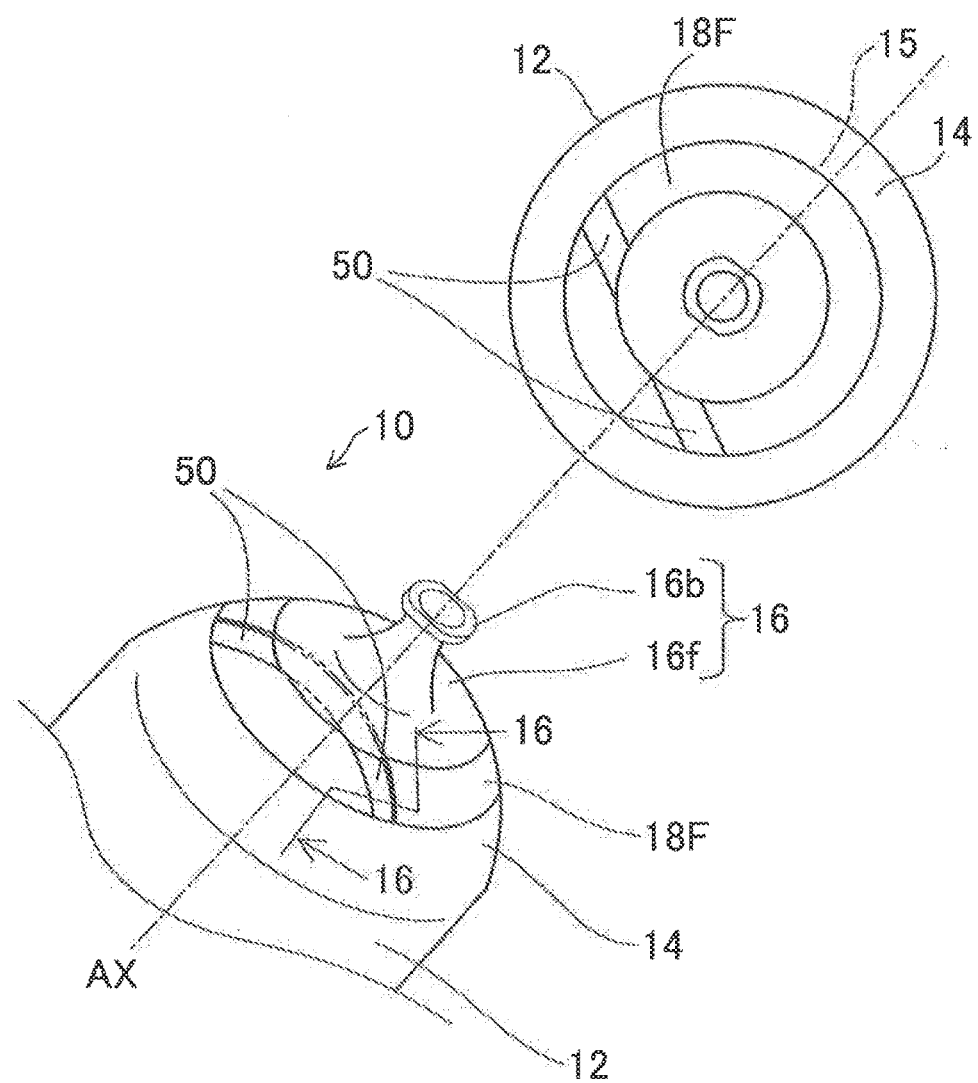
FIG. 15 is a perspective view and a front view for schematically describing a major part of a liner using a gap of a sixth modified example.
Figure 16:
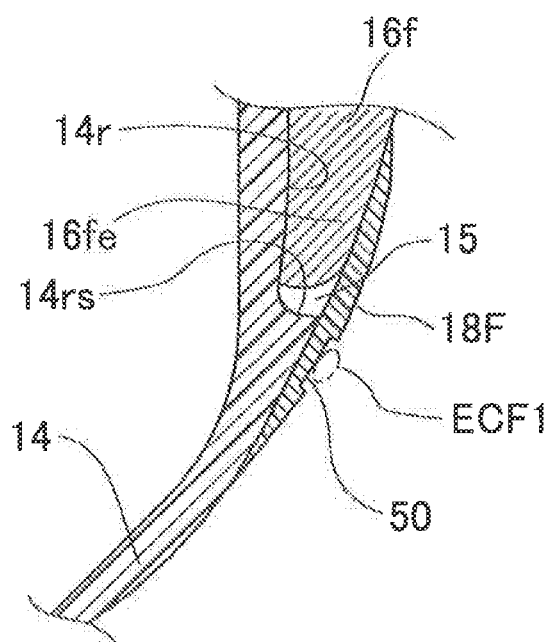
FIG. 16 is a cross-sectional view taken along a curved line 16-16 in FIG. 15 to describe the liner on which the cap is mounted.

FIG. 15 is a view for describing a major part of the liner 10 using a cap 18F of a sixth modified example, showing a schematic perspective view and a front view. FIG. 16 is a view for describing the liner 10 when the cap 18F is mounted, showing a cross section taken along a curved line 16-16 in FIG. 15. The cap 18F of the modified example includes a concave guide 50 entered by the resin-impregnated carbon fiber bundle ECF1 that is helically wound first at the fiber angle αLH (for example, about 11 to 25°) of the low angle to form the innermost helical winding layer described using FIG. 7. The concave guide 50 functions to suppress a positional deviation of the resin-impregnated carbon fiber bundle ECF1 in the fiber bundle width direction due to entry of the resin-impregnated carbon fiber bundle ECF1, is formed along a fiber bundle winding path of the resin-impregnated carbon fiber bundle ECF1 that is helically wound first, and has a depth of about 0.1 mm such that the resin-impregnated carbon fiber bundle ECF1 fits therein. Since the resin-impregnated carbon fiber bundle ECF1 that is helically wound first is helically wound at the low angle while being fitted into the concave guide 50, the resin-impregnated carbon fiber bundle ECF1 is disposed on the dome section 14 to cover the dome section 14 while including the nozzle flange 16f of the nozzle 16 and the cap 18F, and as shown in FIG. 16, pushes the cap 18F against the nozzle flange 16f and the dome section 14. While a component force of the pressing force can be applied to a side at which the resin-impregnated carbon fiber bundle ECF1 is deviated in the fiber bundle width direction from the theoretical line PLc (see FIG. 8) defined on the uniform stress surface of the dome section 14, since the resin-impregnated carbon fiber bundle ECF1 is fitted into the concave guide 50 along the winding path, the positional deviation of the fiber bundle is avoided. Accordingly, according to the method of manufacturing the high pressure gas tank 100 using the cap 18F of the sixth modified example, the deviation of the cap 18F according to the positional deviation of the resin-impregnated carbon fiber bundle ECF1 can be suppressed.

The present disclosure is not limited to the above-mentioned embodiments but various configurations may be realized without departing from the spirit of the present disclosure. For example, technical features of the embodiments corresponding to technical features in the aspects disclosed in the summary of the present disclosure may be appropriately substituted or combined in order to solve some or all of the above-mentioned problems or accomplish some or all of the above-mentioned effects. In addition, any technical features that are not described as essential elements herein may be appropriately deleted.

While the opening concave spot 15 surrounds the liner axis by repeating a rectangular wave form in the above-mentioned embodiment, the opening concave spot 15 may be formed to surround the liner axis AX by repeating a sine wave, a triangular wave, or the like, or surround the liner axis AX such that a heteromorphic shape is provided in a partial region. In addition, the opening concave spot 15 may be formed in a circular shape to surround the liner axis AX, or the opening concave spot 15 may be formed in an arcuate shape to partially surround the liner axis AX.

While the cap 18 is die-formed of the same nylon-based resin as the liner 10 in a ring shape and has the same linear expansion coefficient as the liner 10 in the embodiment, the cap 18 may be die-formed of a different resin material from the liner 10 in a ring shape, and in this case, the linear expansion coefficient of the obtained cap 18 may be as follows. Probability of damage to the cap due to a difference in thermal expansion when the epoxy resin EP that forms the fiber reinforced resin layer 102 is heated and cured can be suppressed as long as the linear expansion coefficient of the cap 18 is not largely different from that of the liner 10. Accordingly, a material that forms the cap may be selected such that the linear expansion coefficient of the cap 18 is equal to that of the liner 10 within a range in which damage to the cap due to a difference in thermal expansion can be suppressed. Alternatively, even when the linear expansion coefficient of the cap 18 is different from that of the liner 10, strength of the cap 18 may be increased to suppress damage to the cap due to the difference in thermal expansion.

While the elastic adhesive agent is applied to at least one of the dome outer surface of the dome section 14 and the flange outer surface of the nozzle flange 16f when the cap 18 is mounted in the embodiment, the elastic adhesive agent may be applied to the inner surface of the cap 18, and the cap 18 to which the adhesive agent is applied may be mounted. Further, application of the elastic adhesive agent before mounting the cap may be omitted.

While a reinforcement fiber bundle wound on the liner external surface through the FW method is the resin-impregnated carbon fiber bundle ECF in the embodiment, in addition to using an epoxy-resin-containing glass fiber bundle, an aramid fiber bundle, or the like, the fiber reinforced resin layer 102 can also be formed by repeatedly winding a fiber bundle in which a plurality of kinds of sliver fibers are bundled, for example, a fiber bundle in which glass fibers and carbon fibers are mixed, through the FW method.

While the liner 10 is formed of two split parts in the embodiment, the liner may be formed of three parts separate from the cylinder section 12 and the dome sections 14 of both sides.

While the first cap engaging area 20 and the second cap engaging area 30 that surround the opening concave spot 15 are formed outside and inside the opening concave spot 15 in the first to third modified examples, the cap engaging area of either the first cap engaging area 20 or the second cap engaging area 30 may be provided.

While the concave guide 50 into which the resin-impregnated carbon fiber bundle ECF1 that is helically wound first enters is formed in the cap 18F in the sixth modified example, as shown in FIG. 7, the plurality of concave guides 50 may be formed such that the resin-impregnated carbon fiber bundle ECF2 that is wound second and the resin-impregnated carbon fiber bundle ECF3 that is wound third enter the concave guides 50.

In addition, while suppression of the positional deviation in the fiber bundle width direction of the resin-impregnated carbon fiber bundle ECF1 that is helically wound first is achieved by the concave guide 50 in the sixth modified example, it is not limited thereto. For example, a plurality of small protrusions present on both sides in a width direction of the fiber bundle as points or convex portions of small protrusions of two lines on both sides in the width direction of the fiber bundle may be formed on the outer surface of the cap 18F such that the positional deviation in the fiber bundle width direction of the resin-impregnated carbon fiber bundle ECF1 that is helically wound first is suppressed.

In the first to sixth modified examples, application of the elastic adhesive agent when the cap is mounted may be omitted.

What is claimed is:

1. A method of manufacturing a high pressure gas tank including a fiber layer formed by mounting nozzles on apexes of dome sections of both ends of a liner in an axial direction and repeatedly winding a fiber bundle on an external surface of the liner, the method comprising:
   preparing the liner having pedestal sections having outer surfaces on which the dome sections are installed along an uniform stress surface and concave surfaces on which the nozzles are mounted on the apexes of the dome sections;
   mounting the nozzles having nozzle flanges entering the pedestal sections and nozzle main bodies protruding from the nozzle flanges toward end sides of the liner on the apexes such that the nozzle flanges enter the pedestal sections;
   mounting ring-shaped caps on boundary portions between flange outer circumferential edges of the nozzle flanges entering the pedestal sections and inner circumferential walls of the pedestal sections, and covering boundary gaps of the boundary portions with the caps; and
   forming the fiber layer by repeatedly winding the fiber bundle impregnated with a thermosetting resin on the external surface of the liner when the nozzles and the caps are mounted; wherein
   the caps having same linear expansion coefficients as the liner and inner surfaces in a curved surface shape of outer surfaces of the dome sections and outer surfaces of the nozzle flanges are used as the ring-shaped caps when the boundary gaps are covered with the caps, and a helical winding layer is formed first by winding the fiber bundle while including the nozzle flanges to cover the dome sections such that the fiber bundle is disposed on the dome sections of both ends in the axial direction when the fiber layer is formed.

2. The method of manufacturing the high pressure gas tank according to claim 1, wherein, when the fiber layer is formed, in forming the helical winding layer that is formed first, winding of the fiber bundle when the helical winding layer is formed is repeated such that a deviation between a theoretical line defined on the uniform stress surface in the dome sections and a centerline of the fiber bundle is within a half of a width of the fiber bundle.

3. The method of manufacturing the high pressure gas tank according to claim 2, wherein, as the fiber bundle is imaged by a camera to obtain the deviation between the centerline of the fiber bundle and the theoretical line defined on the uniform stress surface, and a rotational speed of the liner when the fiber bundle is wound or a reciprocating speed and a reciprocal movement switching timing of a fiber delivery section are adjusted based on the deviation.

4. The method of manufacturing the high pressure gas tank according to claim 1, wherein, when the fiber layer is formed, the helical winding layer is formed first by winding the fiber bundle to cover the dome sections while including the nozzle flanges and the caps.

5. The method of manufacturing the high pressure gas tank according to claim 1, wherein, when the fiber layer is formed, an internal pressure of the liner is boosted after the helical winding layer that is formed first is formed, and in a state in which the internal pressure is boosted, the fiber layer after the helical winding layer that is formed first is formed by repeatedly winding the fiber bundle on the external surface of the liner.

6. The method of manufacturing the high pressure gas tank according to claim 5, wherein, in the fiber layer formed after the helical winding layer that is formed first, the fiber bundle crosses a liner axis at a fiber angle of 11 to 25°.

7. The method of manufacturing the high pressure gas tank according to claim 6, wherein helical winding in which the fiber bundle crosses the liner axis at the fiber angle of 30 to 60° is performed at a predetermined interval along with continuation of the helical winding of the fiber layer after the helical winding layer that is formed first.

8. The method of manufacturing the high pressure gas tank according to claim 1, wherein, when the boundary gaps are covered with the caps, each of the caps is mounted after an elastic adhesive agent is applied to at least one of an outer surface of the dome section and an outer surface of the nozzle flange.

9. The method of manufacturing the high pressure gas tank according to claim 1, wherein each of the caps has a cap-side engaging section including at least one of a convex section and a concave section surrounding the boundary portion on a cap inner circumferential surface, and the liner and the nozzles have engaging sections configured to engage with the cap-side engaging sections provided in the caps.

10. The method of manufacturing the high pressure gas tank according to claim 1, wherein the caps have convex sections entering the boundary gaps.

11. The method of manufacturing the high pressure gas tank according to claim 10, wherein the boundary gaps are formed by the inner circumferential wall of the liner and the flange outer circumferential edges of the nozzles in tapered shapes that widen toward the caps, and the caps have the convex sections as tapered convex sections in the tapered shapes of the boundary gaps.

12. The method of manufacturing the high pressure gas tank according to claim 1, wherein the caps have guides configured to suppress a positional deviation in a width direction of the fiber bundle wound when the helical winding layer is formed first, along a winding path of the fiber bundle in the helical winding layer.

13. The method of manufacturing the high pressure gas tank according to claim 1, wherein hoop winding is performed after helical winding of the fiber layer after the helical winding layer that is formed first.

* * * * *